(12) United States Patent
Zornes

(10) Patent No.: US 6,706,097 B2
(45) Date of Patent: Mar. 16, 2004

(54) MOLECULAR SEPARATOR APPARATUS

(75) Inventor: David A. Zornes, Redmond, WA (US)

(73) Assignee: Hexablock, Inc., Sammamish, WA (US)

( * ) Notice: Subject to any disclaimer, the term of this patent is extended or adjusted under 35 U.S.C. 154(b) by 205 days.

(21) Appl. No.: 09/898,758

(22) Filed: Jun. 29, 2001

(65) Prior Publication Data

US 2002/0066368 A1 Jun. 6, 2002

Related U.S. Application Data

(63) Continuation of application No. PCT/US99/31291, filed on Dec. 30, 1999.
(60) Provisional application No. 60/167,969, filed on Nov. 30, 1999, provisional application No. 60/166,900, filed on Nov. 22, 1999, provisional application No. 60/157,342, filed on Oct. 1, 1999, provisional application No. 60/143,899, filed on Jul. 14, 1999, provisional application No. 60/126,589, filed on Mar. 26, 1999, provisional application No. 60/122,153, filed on Feb. 26, 1999, provisional application No. 60/114,917, filed on Jan. 5, 1999, and provisional application No. 60/114,729, filed on Dec. 31, 1998.

(51) Int. Cl.[7] .................. F25B 17/08; B01D 53/047; B01D 15/08
(52) U.S. Cl. .................. 96/153; 62/101; 62/106; 62/480; 95/90; 95/117; 96/108; 96/121; 96/126; 96/131; 96/133; 204/660; 210/651
(58) Field of Search .................. 62/101, 106, 480; 95/90, 117; 96/108, 112, 121, 126, 131, 133, 153; 204/660; 210/651

(56) References Cited

U.S. PATENT DOCUMENTS

| 5,084,184 A | | 1/1992 | Burns |
| 5,130,027 A | | 7/1992 | Noble et al. |
| 5,813,248 A | * | 9/1998 | Zornes et al. .................. 62/106 |
| 5,912,424 A | * | 6/1999 | Judkins et al. .................. 96/153 |

FOREIGN PATENT DOCUMENTS

| CH | 427 665 | 12/1966 |
| DE | 41 04 513 A1 | 8/1991 |
| DE | 43 07 262 A1 | 9/1994 |
| EP | 0 757 106 A2 | 2/1997 |
| EP | 0 937 497 A2 | 8/1999 |
| JP | 63-274452 | 11/1998 |
| WO | WO 98/50739 | 11/1998 |
| WO | WO 98/55197 | 12/1998 |

* cited by examiner

*Primary Examiner*—David A. Reifsnder
(74) *Attorney, Agent, or Firm*—Christensen O'Connor Johnson Kindness PLLC

(57) ABSTRACT

A molecular sieve apparatus and magnetic/adsorbent material composition facilitate molecular adsorption and separation using a magnetic field to hold, move, cool, and/or heat an adsorbent 1 that is bonded to magnetic materials 3 that are moveable by a magnetic field. An adsorbent 1 is bonded to a soft magnetic material 3 with a binder 2 into a powder composite material adsorbent attractable by a magnetic field (magnetoadsorbent 4). Magnetoadsorbent 4 functions to adsorb and desorb working substances, causing a molecular separation; thereby increasing the efficiency of the adsorption cycle by moving the adsorbent 1 to a location that optimally processes the adsorbent 1. Magnetic field manipulation of adsorbents 1 enables delivery of molecules to locations within systems. Magnetoadsorbents 4 of the present invention further increase the efficiency of the adsorption cycle by combining materials with functions including: catalyst, buoyancy, suspension, magnetic heating, and sinking in liquid.

8 Claims, 15 Drawing Sheets

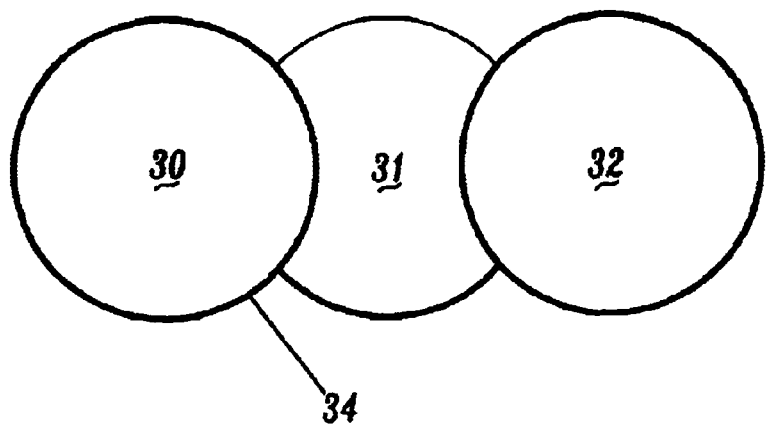
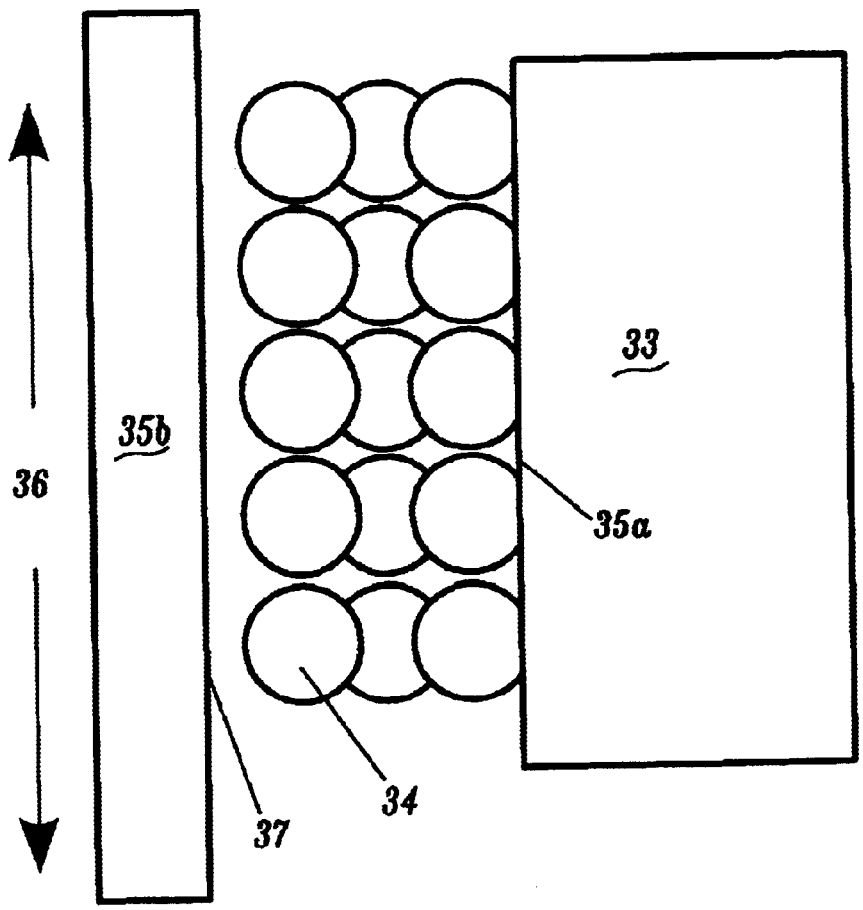
Fig. 8.

MOLECULAR SEPARATOR APPARATUS

CROSS-REFERENCE TO RELATED APPLICATIONS

This application is a continuation of co-pending International Application No. PCT/US99/31291, filed Dec. 30, 1999, which was published by the International Bureau in English (corrected version) on Jul. 6, 2000, and claims the benefit of the filing dates of the following U.S. provisional patent applications: No. 60/114,729, filed Dec. 31, 1998; No. 60/114,917, filed Jan. 5, 1999; No. 60/122,153, filed Feb. 26, 1999; No. 60/126,589, filed Mar. 26, 1999; No. 60/143,899, filed Jul. 14, 1999; No. 60/157,342, filed Oct. 1, 1999; No. 60/166,900, filed Nov. 22, 1999; and No. 60/167,969, filed Nov. 30, 1999.

FIELD OF THE INVENTION

The present invention relates to a magnetic/adsorbent material composition, and more specifically to a magnetic/adsorbent material composition that uses different types of adsorbent material bonded to magnetic materials to adsorb and then remove the molecules adsorbed from a fluid or gas.

BACKGROUND OF THE INVENTION

Molecular sieves are porous, synthetic, crystalline alumino-silicates that function to adsorb some molecules and reject others. The adsorption and desorption are completely reversible. These molecular sieves are adsorbents and referred to in the industry as zeolites. Other adsorbents exist, such as carbon fiber, carbon foam, silica gel, and activated alumina, and each has a unique application. Zeolite molecular sieves have a high kinetic rate of adsorption and have over 50 species that perform differently. The wide range of molecular sieve custom choices make zeolites a desirable material for many applications. Zeolite properties of ion exchange, reversible loss and gain of water, and the adsorption of other gases and vapor make zeolites useful adsorbents.

The molecular sieve crystal structure is a tetrahedron of four oxygen anions surrounding smaller silicon or aluminum cations. Sodium ions, calcium ions, or other exchangeable cations make up the positive-charge deficit in the alumina tetrahedral. Each oxygen anion is also shared with another silica or aluminum tetrahedron, extending the crystal lattice in three dimensions.

The crystal structure is honeycombed with relatively large cavities that are interconnected by apertures or pores. The entire volume of these cavities is available for adsorption. For example, the free aperture size of the sodium-bearing Type 4A molecular sieve (manufactured by UOP Inc. of Des Plaines Ill.) is 3.5 angstroms in diameter, which allows the passage of molecules with an effective diameter as large as 4 angstroms. Altering the size and position of the exchangeable cations can change the size. By replacing the sodium ions with calcium ions, for example, the effective aperture size can be increased to 4.2 angstroms. Using different or modified crystal structures can also change the aperture size.

Adsorbents are a versatile process tool in adsorption systems. They are usually used in multiple-bed molecular sieve systems common to large scale, commercial fluid purification units. These separate beds can be plumbed together. A common approach involves one onstream bed that is drying and/or purifying the fluid, and another that is regenerated by hot purge gas and then cooled. In regenerated beds, the beds are heated by convection or conduction. In carbon fiber monolith beds, electrical current can be applied across the fibers. As the adsorbent bed cools, the bed begins the process of adsorbing gas from the working fluid and starts the cycle over again. When an adsorbent bed is saturated with working gas fluid, the cycle is complete. The adsorbent vessel beds are then reheated and cooled to repeat the previous cycle.

In situations where an interrupted flow is acceptable, a single adsorption bed can be used. Then when the adsorption capacity of the bed is reached, the bed is taken off-line and regenerated for subsequent use. Molecular sieves are particularly useful in situations that require gas streams that are extremely dry. Molecular sieves can obtain water concentrations below 0.1 ppmw in a dynamic drying service over a wide range of operation conditions.

When co-adsorption of carrier stream molecules is a serious problem (e.g., in olefinic process streams) co-adsorption can be prevented by selecting a molecular sieve with a critical pore diameter small enough to prevent other stream components from being admitted to the active inner surface of the adsorption cavities. Molecular sieves can also be used for one-step drying and purification by selecting the proper molecular sieve and providing sufficient bed to retain the other impurities along with water.

Since molecular sieves adsorb materials through physical forces rather than through chemical reaction, they retain their original chemical state when the adsorbed molecular is desorbed. There are five types of adsorption/desorption cycles:

1. Thermal swing cycles involving rising desorption temperatures;
2. Pressure or vacuums swing cycles involving decreased desorption pressures;
3. Purge-gas stripping cycles using a non-adsorbed purge gas;
4. Displacement cycles using an adsorbable purge to displace the adsorbed material; and
5. Absorptive heat recovery, using the retained heat of adsorption to desorb certain molecules (e.g., water).

Molecular sieves are available in a variety of shapes and sizes. The most common are: 1/16 and 1/8 inch pellets; beads, 8 by 12 and 4 by 12 mesh; three pellets bonded into a triangular type extrusion, granulated particles in sizes from 6 to 60 mesh; and powders. Zeolites in prior art are typically beads, cylindrical pellets, or solid molded shapes to prevent raw zeolite crystal powder from going into an airborne state when hot air is used for cooling. The raw zeolite crystal powder is approximately 3 to 5 microns in size and very difficult to handle. These pure crystals are mixed with a clay and binder like polyphenylene sulfide (PPS) or aluminum phosphate, to form the zeolite beads, pellets, and molds. Beads and pellets have an attrition rate that is predictable based on the type of liquid, gas, or vapor adsorbed, vibration, heating cycles, and hot air-drying velocity. Screen meshes are used to contain the beads and pellets and allow cleaning.

Zeolite has a large internal surface area (of up to 100 $m^2/g$), and a crystal lattice with strong electrostatic fields. Adsorbates are the gases or fluids that zeolite adsorbents adsorb. Zeolite retains adsorbates by strong physical forces rather than by chemical adsorption. Thus, when the adsorbed molecule is desorbed by the application of heat or by displacement with another material, it leaves the crystal in the same chemical state as when it entered. The very strong adsorptive forces in zeolite are due primarily to the cations, which are exposed in the crystal lattice. These cations act as sites of strong localized positive charge, which electrostatically attract the negative end of polar molecules. The greater the dipole moment of the molecule, the more strongly it will be attracted and adsorbed. Polar molecules are generally those, which contain O, S, Cl, or N atoms and are asymmetrical. Water is one such molecule. Other molecules that adsorb include, but are not limited to Ar, Kr, Xe, $O_2$, $N_2$, n-pentane, neopentane, Benzene, Cyclohexane, and $(C_4H_9)_2N$. Under the influence of the localized, strong positive charge on the cations, molecules can have dipoles induced in them. The polarized molecules are then adsorbed strongly due to the electrostatic attraction of the cations. The more unsaturated the molecule, the more polarizable it is and the more strongly it is adsorbed.

Carbon fiber and carbon foam monoliths (developed by Oak Ridge National Lab Tennessee, U.S.A.) reduce attrition and increase thermal efficiency, however these monoliths are still batch adsorptions like the pellets. These carbon fiber monoliths are more efficient to heat and do not require screens to contain the adsorption materials. Activated carbon fiber has a strong attraction to carbon dioxide and a surface area greater than 1000 $m^2/g$. Carbon fibers can be activated for a wide range of molecules. Carbon foam has the highest thermal transfer rate, and gas or fluid can pass through it. Carbon foam can have additives applied, to make it an adsorbent and it can be atomized into smaller pieces.

A further drawback of current adsorbent batch systems is that the capacity of the adsorbent bed has to be matched to the volume of working substance. If the adsorbent capacity is too low, the adsorbent bed size has to be increased, or increased capacity can be gained by adding more beds. Further, adsorbents can become saturated while there is still working substance in presence of the bed, preventing the separated gas from being pure. This is inefficient because the adsorbent must be recharged more often than it would if each gas specific zeolite could be added to the air source and then removed from the gas source instantly after adsorption. If the adsorbent capacity needs to be high in a dense transportable system, the adsorbent vessel is larger than necessary and therefore unusable.

Desorption from zeolite powders shows no hysteresis. The adsorption and desorption are completely reversible. However, with pellet zeolite material some further adsorption may occur at pressures near the saturation vapor pressure, through condensation of liquid in the pellet voids external to the zeolite crystals. Hysteresis may occur on desorbing this macro-port adsorbent.

One drawback of the prior art (and devices described above) is that the zeolite is stationary in a bed, inherently requiring several vessels to separate several molecules in a batch process. Such zeolite gas separation systems inherently need to have several zeolite beds. Another drawback of the prior art devices described above, is that the zeolite beds have to be heated. The more adsorption capacity that is needed, the larger the bed and heated area have to become. Heat is lost in the high surface area of the bed vessel housing. Further, heat has to be applied to activate the bed. This heating in the presence of the working fluid can chemically change the working fluid. This increased surface area is inefficient. A small separate heated area is more desirable. There is a continuing need in the art for an adsorbent that can be separated rapidly from the source working fluid and then heated separately for desorption as well as cooled to prepare for the potential of adsorption, before it is reentered into the working gas or fluid.

A further drawback of the prior art, is that adsorbents do not float or suspend in a fluid in a controlled manner. It is desirable to have several types of controllable zeolite, one that floats on the surface of fluid or gas, one that suspends in solution, or gas, and one that sinks to the bottom of the adsorbent vessel.

Yet a further drawback of the prior art, is that the stationary adsorbent beds require that the working fluid be moved rather than the adsorbent. Remaining residue from the fluid, after adsorption, has to be moved from the bed. This fluid can be hazardous. It is desirable to remove the adsorbent from the residue so other chemical processing can occur in the residue without the adsorbent present. There is a continuing need in the art for the rapid removal of adsorbents, so that the volume and rate of the work can be increased. The present invention fulfills these needs and provides further related advantages.

SUMMARY OF THE INVENTION

The present invention is directed to molecular separators (magnetoadsorbents) that employ an adsorption material composition that uses magnetic fields to move adsorbent materials to different locations in a system requiring adsorbents. Magnetoadsorbents include soft magnetic materials (e.g., ferritic alloy metals) that are bonded to adsorbents such as zeolites, carbon fibers or foam, with binders that keep the active part of the adsorbents open for adsorption. Magnetic fields can attract the ferritic metals bonded to adsorbents. Different metals can be combined with different adsorbents with binders to provide different functions.

Magnetic characteristics of the magnetoadsorbents of the present invention are capable of adsorbing a selected molecule in a continuous process instantly separating a mixture of molecules. Magnetic fields are used to attract saturated adsorbents of magnetoadsorbents from a working substance in the solid phase as well as the liquid phase. The present invention provides a further improvement over the prior art because the amount of adsorbent material increases or decreases during processing and the location of the adsorbent can be moved from the adsorption vessel to the desorption vessel as part of the continuous process within the molecular sieve apparatus.

In another aspect of a preferred embodiment of the present invention, floating and suspending materials are added to the binders that bind the metals to the adsorbents. Many materials are satisfactory for this purpose that float, suspend or sink. Completely coating adsorbent materials and trapping air in the adsorbents provides floating adsorbents. Different air volumes are also trapped to make the adsorbent float or suspend.

In another embodiment of the present invention, the conduit between the first and second vessels contains a turbine. The turbine is coupled to a power transmission device outside the conduit such that when water diluted hydrogen peroxide is passed into an intake conduit it substantially separates the water from the hydrogen peroxide stream by water adsorption into a water adsorbent. The high concentration of hydrogen peroxide then passes through a catalyst bed that chemically changes the hydrogen peroxide into steam (of approximately 600° C.) and oxygen. The heat in the steam regenerates the zeolite powder at the same time it rotates the rotor of the turbine generating power, which is transmitted to the power transmission device. The air stream containing zeolite dust, water vapor, and oxygen passes through an air stream reverse rotation moisture separator returning dry zeolite dust to the intake conduit and centrifugally collects the water into a separate drain. This process continuously recycles the magnetoadsorbent or an adsorbent dust alone.

In a further embodiment of the present invention, a separator device is connected in fluid communication with the conduit of a fuel cell that convert hydrogen and oxygen to water generating electricity. The zeolite powder will be passed in the air stream to deliver oxygen and hydrogen to the cell membrane and then remove the water from the wastewater side of the fuel cell. Three species of adsorbents can be applied in the magnetoadsorbent, each can be contained within a closed loop of their own to deliver and adsorb each the above molecules.

In yet a further embodiment of the present invention, the first vessel and separator device are coupled to a hydrogen-oxygen fuel cell. The adsorbent material in the first vessel draws water from the fuel cell, thereby cooling the cell and improving the fuel cell efficiency. The separator device may be used to remove a portion of the water passing out of the fuel cell to delay the point at which the first vessel must be desorbed.

In yet a further embodiment of the present invention, the adsorption has previously been employed to separate molecules from a mixture of molecules. Adsorption is a process that utilizes the natural affinity certain adsorbent materials have for adsorbates. A typical adsorption cycle employing adsorption includes two phases. During one phase, the dried or charged adsorbent material is exposed to a liquid adsorbate. The affinity the adsorbent has for the adsorbate causes the adsorbate to enter a vapor state as it is attracted to the adsorbent. The conversion of the adsorbate from a liquid state to a vapor state is an endothermic reaction, which extracts heat from the environment surrounding the liquid, and therefore cools the environment and heats the adsorbent. During the second phase, additional heat is supplied to the adsorbent to expel or desorb the adsorbed vapor, thereby recharging the adsorbent. The desorbed vapor is condensed and cooled, and the two-phase cycle is repeated.

In another embodiment of the present invention, a separator device is connected in fluid communication with the conduit between the first and second vessels. The separator removes a part of the working substance, which passes from the second vessel to the first during adsorption. The part of the working substance removed by the separator may be returned to the second vessel for another cycle without requiring the first vessel to be heated. The separator device therefore delays the point at which the first vessel is heated to desorb the working substance.

In yet another embodiment of the present invention, the adsorbent material may include a carbon fiber material. Carbon fiber and carbon foam can be attached to magnetic alloys. Carbon materials like carbon foam mentioned above, for example, can be foamed with magnetic alloys in the foam. This carbon foam has a low-density highly conductive surface area making it one of the most thermally conductive materials. (Aluminum foam, copper foam, ceramic foam, etc. can be applied as well). Carbon foam magnetoadsorbents can be pulled in and out of fluids cooling the fluid. Carbon foam magnetoadsorbents are easier to obtain a thermal exchange with because they are broken down into movable small pieces that have high surface area exposure and can be applied to remove heat or distribute heat in air-conditioned and heating systems.

In still another embodiment of the present invention, carbon fiber monolith are injected with odorents and electrically desorbed to reproduce smells. These systems are applied to reproduce smells over the Internet and TV signals.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 illustrates a cross sectional view of an embodiment of the present invention comprising a dry solid film lubricant as the adsorbent bonded by a tough copolyimide to soft magnetic alloy, including a magnet holding the lubricant in place;

DETAILED DESCRIPTION OF THE PREFERRED EMBODIMENT

Figure 1:
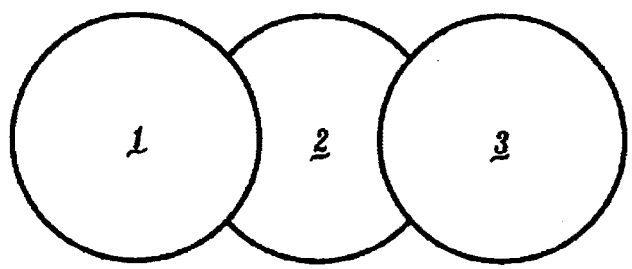
FIG. 1 illustrates a cross sectional view of an embodiment of the present invention with an adsorbent bonded to a soft magnetic alloy to form a composite powder.

FIG. 1 illustrates a preferred embodiment magnetic/adsorbent material composition constructed in accordance with the present invention, that facilitates molecular adsorption and separation using a magnetic field to hold, move, cool, and/or heat an adsorbent that is bonded to magnetic materials that are moveable by a magnetic field. An adsorbent 1 is bonded to a soft magnetic material 3 with a binder 2 into a powder composite material adsorbent that is attractable by a magnetic field. This new composite powder is referred to hereinafter as a magnetoadsorbent 4. In other preferred embodiments of the present invention, the materials used to produce the magnetoadsorbents 4 are varied. For example, newly emerging polymer materials that are attracted to magnetic fields and copolyimide-based moldable magnets can be substituted for the soft magnetic material 3.

Preferably, the magnetoadsorbent 4 includes adsorbents 1, which are bonded to ferritic metals 3 composed of soft magnetic alloys. The magnetoadsorbent functions to adsorb and desorb working substances, causing a molecular separation; thus, increasing the efficiency of the adsorption cycle by moving the adsorbent 1 to a location that processes the adsorbent 1 in the most optimized conditions. Magnetic field manipulation of adsorbents 1 provides the ability to deliver molecules to locations within systems.

Magnetoadsorbents 4 of the present invention further increase the efficiency of the adsorption cycle by combining materials with functions including: catalyst, buoyancy, suspension, magnetic heating, and sinking in liquid. Thus, magnetoadsorbents 4 allow adsorbents 1 to be applied in cycles previously not possible with stationary adsorbents exhibiting simple entropy, if dipped and saturated in a solution.

Some soft magnet alloys can be magnetically attracted very easily, while non-ferritic metals like copper or aluminum do not attract to a stationary magnetic field. Copper and aluminum will develop a magnetic field, if moved relative to a magnetic field at an eddy current generating velocity. Copper in the presence of a magnetic field could be held or relocated by the eddy current effect. Any ferromagnetic material like gadolinium or other material, which exhibits a magnetocaloric effect (i.e., which has the property of heating up when placed in a magnetic field and cooling down when removed from the magnetic field) can be applied as the metal bonded to the adsorbent.

The magnetocaloric class of metals heat in the presence of a magnetic field and can eliminate or reduce the need for heating adsorbents by an independent technique. In a preferred embodiment of the present invention, this class of adsorbent metal compound will be combined with metals that attract magnetically and at the same time desorb the adsorbent with magnetocaloric heat. Several species of magnetocaloric materials that operate at different temperature ranges can be combined in a system to make a cascading type refrigeration cycle effect. All the species of materials referenced herein function in open, or closed systems.

In accordance with the present invention, the adsorbent 1 can be heated anywhere, away from the source adsorbate or gas, and then returned for adsorption. Thermal chemical reaction will not occur, and catalytic reaction will be easier to manage, since the adsorbent 1 is physically moved from one location to the other by magnetic field controls. Further, in some embodiments the magnetoadsorbents 4 contain catalyst materials, providing a catalyst that can be added to start a chemical reaction and then substantially removed. Some catalyst reactions need an even distribution of catalyst and this technology can provide an aggregate effect, gathering density, or a uniform effect by magnetic field application. Prior art does not teach uniform gradient or thermal processing.

The binder 2 is selected for thermal cycling and compatibility with the adsorbent 1, keeping the adsorbent sieve open to adsorption yet adhered to the metal powder. The size of these powder clusters are varied and sieved through a set of physical screens to sort the sizes. Powder clusters of different sizes are provided; a large cluster for water, and smaller clusters for carbon dioxide. All these clusters can be mixed together and later sieved through screens to separate the water from the carbon dioxide based on the physical size of the magnetoadsorbent.

Preferably, adsorbents 1 and ferritic metals 3 are bonded by a tough, soluble, and aromatic thermoplastic copolyimide (as described in U.S. Pat. No. 5,639,850 to R. Bryant, incorporated herein by reference). The thermoplastic copolyimide is relatively a new material, but is more resistant to attrition than current bonding materials for zeolites such as polyphenylene sulfide (PPS) or aluminum phosphate. The adsorbents can be grown directly onto the magnetic materials, bonding, without additional binders that might be organic based, and swell in the presence of some solvents. Economic soft magnetic ferritic metal alloys include silicon iron at 22 kilogauss, carbon iron at 20 kilogauss, chromium iron (commercially referred to as ferritic stainless steel at 15 kilogauss), and aluminum iron.

The current most attractable metal is Hiperco 50 (manufactured by Carpenter Steel a Division of Carpenter Technology, 10 West Bern Street, Reading, Pa. 19601, U.S.A.) composed of 48% cobalt, 50% iron, 2% vanadium, providing the highest magnetic saturation 24 kilogauss. All these metals can be atomized into powder metals and sorted for the smallest powder sizes. Hiperco 50 magnetizes and demagnetizes in the shortest time frame. Most soft magnetic alloys will take excursion temperatures in the range of 750° F. Ferritic stainless steel is rust resistant and makes the best choice for water applications or other liquid, gas, and vapor working substances that induce rust. Iron powder or magnetic particles are preferred when adsorbents can be grown around the particle to prevent corrosion.

Figure 2:
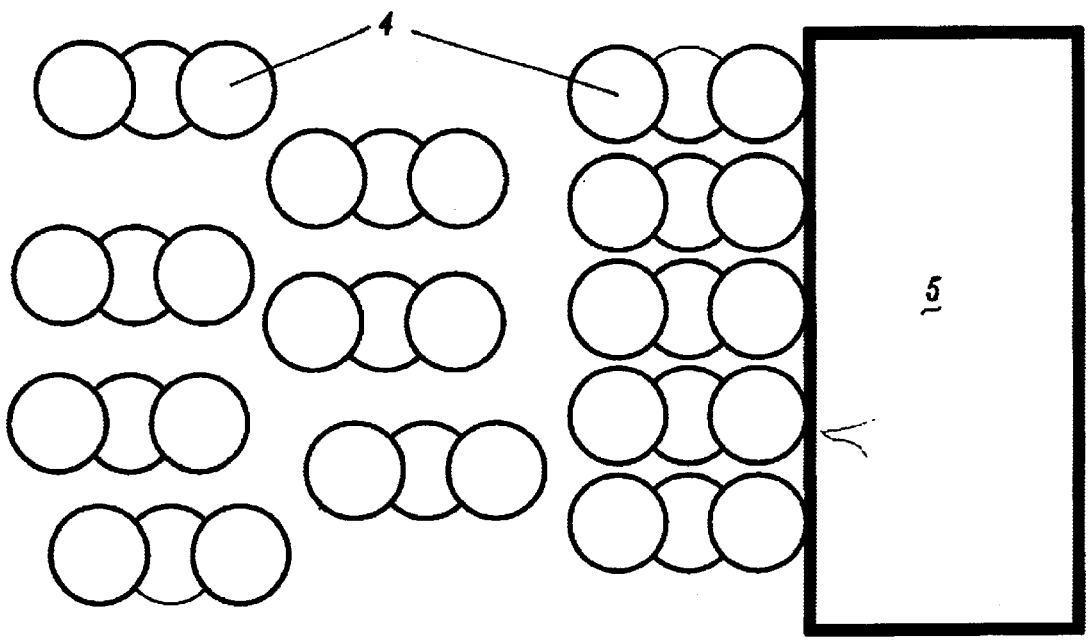
FIG. 2 illustrates a cross sectional view of an embodiment of the invention in which the composite powder in FIG. 1 in moved to a magnet source.

Referring now to FIG. 2, magnetoadsorbents 4 are in the presence of a magnetic source 5. Preferably, the magnet source 5 is an electromagnet, a series of electromagnets that pulse in a progression that moves the magnetoadsorbent, a permanent magnet, a superconductor, or any other magnetic field source. Magnetoadsorbents 4 are attracted to the magnet source 5. FIG. 2 shows the process of magnetic attraction only partially finished. A portion of magnetoadsorbents 4 are contacting the magnet source 5 and a portion of magnetoadsorbents 4 are still moving toward the magnet source 5. This process would normally take a second or less to complete. The thickness of the fluid will vary the kinetic rate of magnetic attraction in a fluid. These magnetoadsorbents 4 are used to apply materials by adsorbing a selected molecule in a fluid that adsorbs other fluids, or that mix with other fluids. A carrier fluid can be used to apply the selected molecule to a final destination.

In one preferred embodiment of the present invention, magnetoadsorbents 4 are used to apply phosphorus in flat TV screens (manufactured by Candescent Technologies Corporation, 6320 San Ignacio Avenue, San Jose, Calif. 95119). Magnetoadsorbents 4 are also used to clean moisture out of electronic devices that are required to be maintained as physically close as possible to completely dry. In another aspect of the present invention co-polyimides (incorporated be reference above) replace polyimides for binding phosphorus to the screen and reducing outgasing. The co-polyimides are photo-imageable as the polyimide to pattern the phosphorus. Phosphorus is placed in polyimide micro spheres that are transparent making the overall vacuum in the system insignificant relative to phosphorus potential outgas and moisture damage. Phosphorus filled micro-sphere are going to maintain clarity for the life of the product. High integrity high strength low cost TV screens are possible with this novel invention. Reflective one-step polyimide materials can be partially coated on any of the inner or outer parts of the sphere to obtain the optimal visual brilliance. Small magnets can be embedded into the sphere to maintain its location and form an array of sphere against matching magnetical particles in attached to spheres. Thus, in accordance with the present invention, the polyamic acid in the co-polyimide is modified to make photo-imageable polyimides.

Moisture in electronic manufacturing collects other gases and dirt, including the prevention of nano (microscopic) circuits from being applied successfully with minimum error. In accordance with the present invention, magnetoadsorbents 4 are dropped onto these type of circuits and structures and then removed minimizing moisture exposure. Solvents like DMSO (dimethyl sulfoxide) collect moisture and require removal by dipping magnetoadsorbent into the solvent and removing by magnetic manipulation. The material will be integrated into the circuits replacing other adsorbents that are present to adsorb outgasing gases from other needed structures within the electronic components.

In another preferred embodiment, magnetoadsorbents 4 of the magnetocaloric type heat in the presence of a magnetic field and are used to localize the heat of desorption just prior to pulling a vacuum on a TV screen. Only the magnetocaloric materials will heat in a localized point preventing damage from occurring to thermally sensitive electronic components.

The biotechnology field has the same problem delivering the molecules in the correct quantity and selecting out pathogens that later can be harvested for selected molecules. In biotech manufacturing processes the selection of molecules and pathogens are growing on or selecting the remains of a metabolic process is useful in precisely processing, "taxiing" out molecules or pathogens. Magnetoadsorbent 4 molecular separation occurs as a chemical change in a batch that matures; thus, turning a batch process into a continuous process. By employing the present invention, target organisms or molecules are selected and removed. Additionally, cancer tumors are loaded with magnetocaloric to heat only the cancer or tumor cells, as well as freeze biomass if needed.

The use of the magnetocaloric depends on the application. In specific applications of the present invention, the adsorbent 1 in the magnetoadsorbent 4 is replaced (or used in conjunction) with a biological binder specific to biological target cells or tissue. In this scenario the target cells are cancer. Biological binder specific magnetoadsorbent 4 are applicable to plants as well. An addition value of these small 3 to 7 micron sized nano-magnetoadsorbent particles is that they are injectable into the blood and are magnetically removable.

Figure 3:
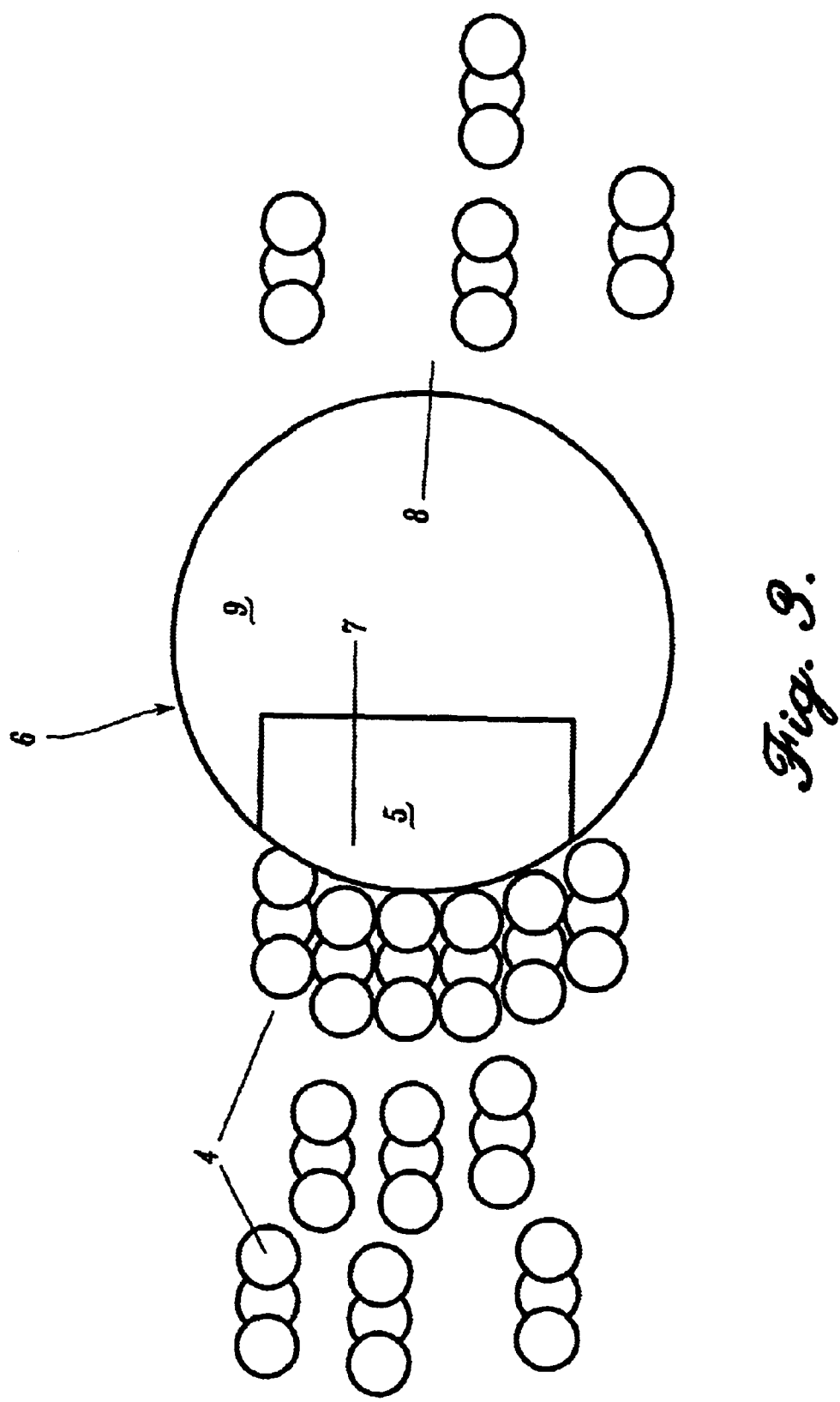
FIG. 3 illustrates a cross sectional view of powder composites being attracted to a magnet source and then released from that magnet source in a deposited area.

Referring now to FIG. 3, magnetoadsorbent 4 are attracted to a magnetic source 6, which includes a magnet source 5 and a spinning wheel 9 that provides relocation of the magnetoadsorbent 4 from the gathering magnetic region 7 to the non-magnetic region 8 where the magnetoadsorbent 4 is deposited for desorption. The magnetic field attracts and holds magnetoadsorbent 4 to the wheel 9 until the wheel 9 moves magnetoadsorbent 4 into the non-magnetic region 8 for release. Wheel 9 can be replaced by dipping a magnet into gas vapor, or liquid, a long conveyer system that has magnetic source 5 at its end, or any other apparatus that attracts and transports the magnetoadsorbents 4.

In accordance with the present invention, saltwater desalination is achieved by depositing magnetoadsorbents 4 into saltwater, and then magnetically removing the water saturated magnetoadsorbents 4. The saltwater passing out of the system has a higher mineral density. A preferred magnetoadsorbent 4 is approximately 40 percent iron, 35 percent silicon oxide, 20 percent aluminum oxide (non-fibrous), 15 percent sodium oxide, 10 percent potassium oxide, 5 percent magnesium oxide, and 2 percent quartz. Preheated magnetoadsorbent 4 with this high iron content provides a substantial increase in desalination when dropped in saltwater heated. Zeolite materials substantially protect the iron from oxidizing. A very tight zeolite can be modified, as well as other types referenced in this patent. In addition, the magnetocaloric class of metals heat in the presence of a magnetic field and are important in desalination to desorb the adsorbent economically.

Figure 4:
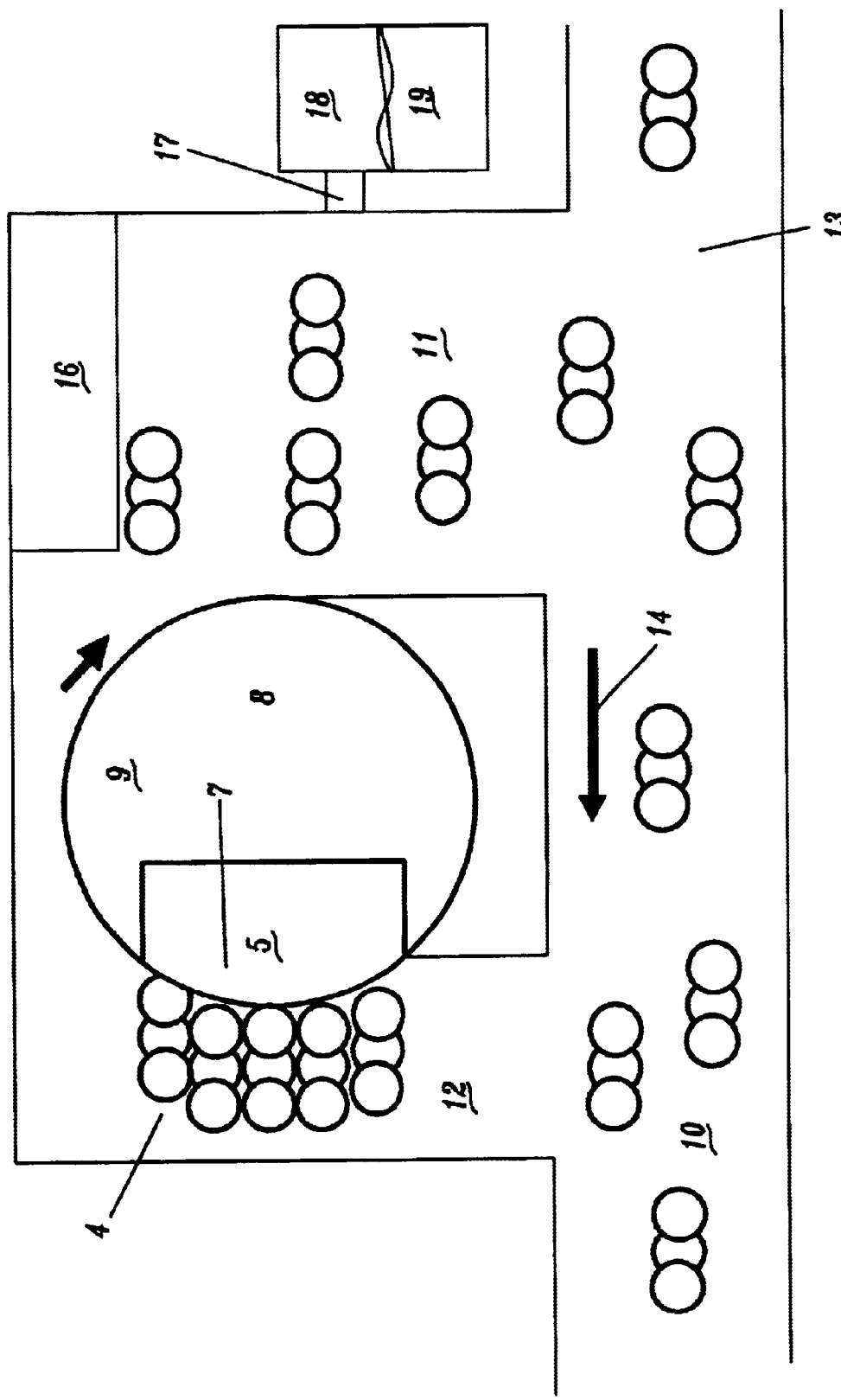
FIG. 4 illustrates a cross sectional view of a conduit system that separated molecules from a stream by adding adsorbents and removing adsorbents from the stream.

FIG. 4 shows conduit 10 with inlet port 11 and outlet port 12. Salt water fluid 13 is moving through the conduit 10 marked by arrow 14. In this embodiment, the magnetoadsorbent 4 is made from a water adsorbent bonded to ferritic stainless steel powder. Magnetoadsorbent 4 is deposited into the inlet port 11 mixing with the fluid adsorbing water from the saltwater. As the fluids 13 move down the conduit 10 the magnetoadsorbent 4 becomes saturated with water just before passing outlet port 12. Outlet port 12 includes a magnet source 5 and wheel 9. The magnet source 5 attracts the magnetoadsorbent 4 to the outlet port 12, removing magnetoadsorbent 4, substantially saturated with only water. Magnetoadsorbent 4 is then heated outside the conduit in a chamber (not shown), to heat the water with heat source 16, and then return the magnetoadsorbent 4 to the inlet port 11, to start the cycle all over again. The saltwater passing outlet port 12 has a higher mineral density.

In FIG. 4, a fluid cycling moving between an adsorption phase and desorption phase is shown. In the desorption phase, the heat source 16 is activated and heats magnetoadsorbent 4, causing any liquid working substance contained in the magnetoadsorbent 4 to vaporize. The working substance vapor passes from the magnetoadsorbent 4, through conduit 17 and then into the condensate vessel 18 where it condenses, forming a pool of liquid working substance 19. In one embodiment, where the working substance is water, the adsorbent vessel is heated to a temperature up to 500° F. to desorb the working substance water vapor from magnetoadsorbent 4. Other temperatures are possible as well, depending upon the component characteristics of the magnetoadsorbent 4.

Figure 5:
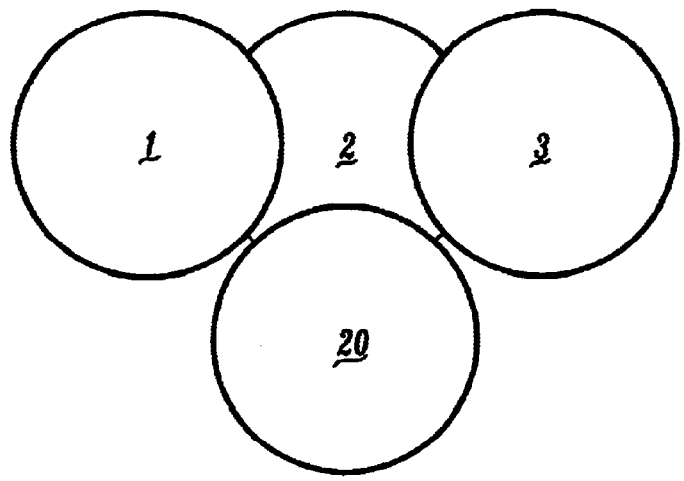
FIG. 5 illustrates a cross sectional view of an embodiment of the present invention in FIG. 1 with a material added for added functions like floating.

Referring now to FIG. 5, a magnetoadsorbent 4 of the present invention is shown with a material 20 added for functions like floating. This illustrates how a material is added to magnetoadsorbent 4 to add an additional function. Additions are made up to the size of current pellets, beads, and other shapes. The overall function would be the same.

In this preferred embodiment of the present invention the magnetoadsorbents 4 are constructed to float. In this embodiment a portion of the adsorbent 1 still needs to be exposed through the binder for adsorption of a liquid, gas, or vapor. In a device where cooling is desired a floating adsorbent 1 that is magnetic will remove the latent heat from the water, because the adsorbent removes the most polarized water molecules first which are the heated molecules. A magnetic field is applied to remove the adsorbent 1 with the latent heat in the adsorbent 1, leaving an ice or cooled water behind. When the water has a great volume it is desirable to have adsorbent 1 at the bottom of the vessel, in a suspension, and at the surface to collect the heated molecules at all the levels in the water. This instant cooling effect in the water is to be used in refrigeration or climate control systems. This cooling system has the advantage of being in an open or closed system and fast cycling. This is a near instant process and will not work, if heat adsorption is allowed to take place within the depth of fluid. The speed at which the magnetoadsorbent can be removed is the important phase.

Figure 6:
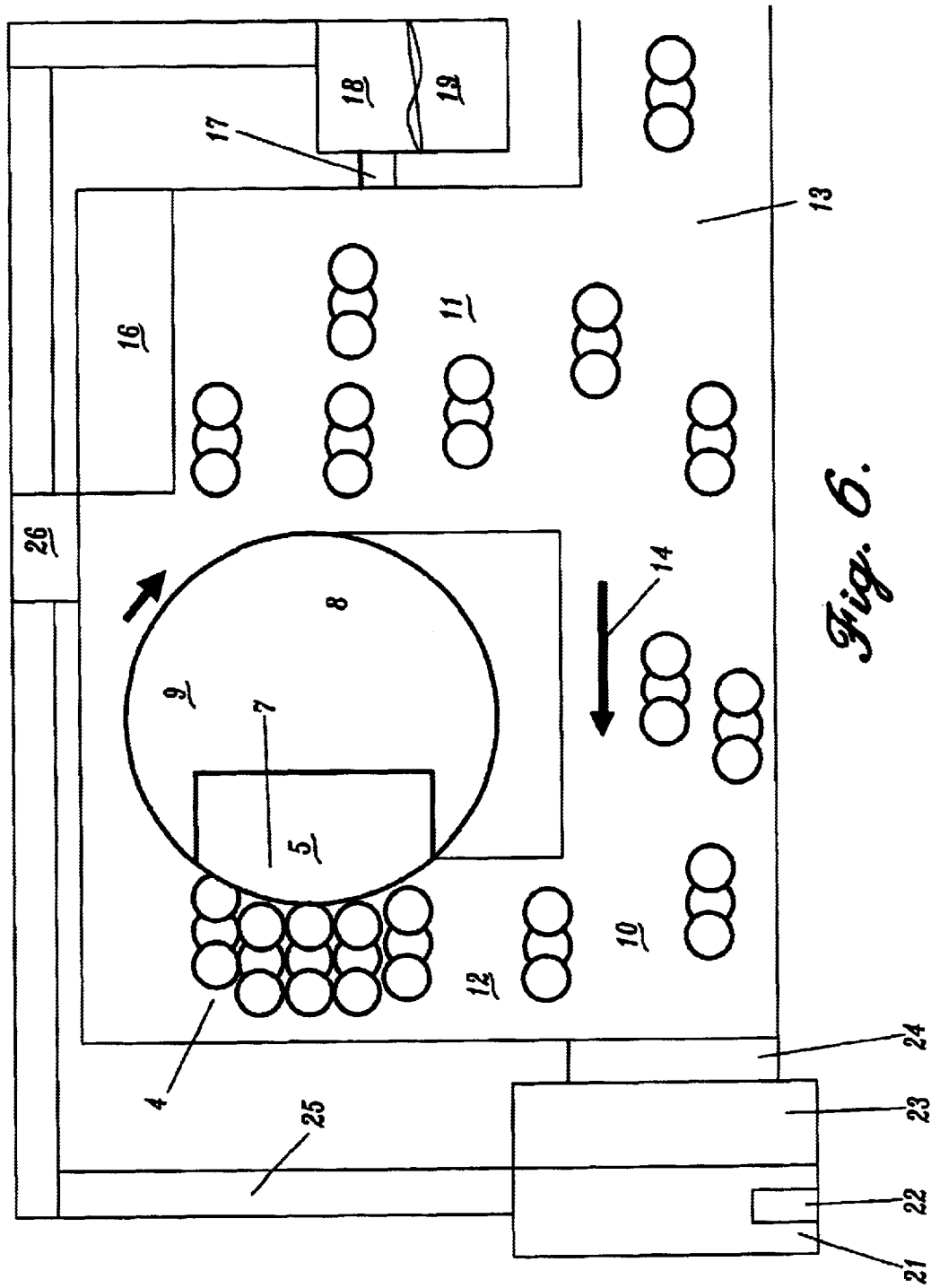
FIG. 6 illustrates a cross sectional view of an embodiment of FIG. 4 with the addition of a turbine on the outlet port of the conduit.

Referring now to FIG. 6, an embodiment of the present invention of FIG. 4, is shown with the addition of a turbine on the outlet port of the conduit. In one embodiment of the present invention, the fluids 13 are a water-diluted hydrogen peroxide and serve as a separation system. On the end of conduit 10 past outlet 12, a catalyst bed 24 or bi-propellent addition is added to convert the hydrogen peroxide to hot steam and oxygen. (The catalyst 24 could be of the type developed by the U.S. Navy Air Systems Warfare research at China Lake, Calif.) The hot steam is moved through heat source 16 for desorbing magnetoadsorbents 4. Once a chemical reaction occurs, zeolite dust can be the sole technique of adsorbing the water. When the steam and hot dry zeolite pass through the heat source 21 a reverse rotation component 26 (like air compressors used to separate water from intake air) is applied to separate the water from the air. A turbine 23 is attachable anywhere in the conduit after hydrogen peroxide 13 is converted to steam and oxygen by a catalyst 24. Montmorillonites are coated on all surfaces with which the hydrogen peroxide might be in contact, because it layers over 100 water molecules thick providing a pure chemical barrier between potential conduit or tank walls and the hydrogen peroxide. Montmorillonite can also replace the zeolite powder.

Water diluted hydrogen peroxide can be transported safely in vehicles, if diluted in ratios of 70% water and 30% hydrogen peroxide. This dilution ratio can vary widely based on climate, holding container materials, and water purity. However, before hydrogen peroxide will react with ceramic monolith catalyst beds developed to operate without attrition to chemically convert the hydrogen peroxide into usable fuel (600° C. hot steam and oxygen), 92% or greater hydrogen peroxide purity is needed. The hydrogen peroxide needs to be near purity. Hydrogen peroxide purity can be achieved instantly by applying this technology. A catalyst bed or bi-propellent addition is added to chemically change hydrogen peroxide. A turbine is attached anywhere in the conduit after hydrogen peroxide is chemically changed to steam and oxygen. Cold water can also be added to control the steam pressure within mechanically safe limits.

In the present invention, the preferred turbine is a MICRO TURBINE™ (manufacture by the CapStone Turbine Company in Connecticut, U.S.A.). When water diluted hydrogen peroxide 13 is passed into an intake conduit 12 it substantially separates the water from the hydrogen peroxide by water adsorption into a magnetoadsorbent 4. The high concentration of hydrogen peroxide then passes through a catalyst bed 24 that chemically changes the hydrogen peroxide into 600° C. steam and oxygen in turbine preheating section 23. The heat in the steam regenerates (dries) the zeolite powder at the same time it rotates the rotor of the turbine generating power.

The air stream containing zeolite dust, water vapor, and oxygen passes through conduit 25 and through an air stream reverse rotation moisture separator 26 returning dry zeolite dust or montmorillonite to the intake conduit 12 and centrifugally collects the water into a separate chamber 18 from conduit 25. The separator 26 extracts at least a part of the working substance as the working substance passes in a fluid stream conduit 25. The fluid stream contains gases and/or liquids. In one embodiment, the separator 26 is a centrifugal device, such as an Eliminex® separator (manufactured by Reading Technologies, Inc. in Reading, Pa.), though in other embodiments, other separator devices may be used.

In the preferred embodiment, the separator 26 has a substantially circular cross-sectional shape. The fluid stream, which includes the working substance vapor, enters the through the conduit 25 tangentially and swirls downward in an arcuate path toward a liquid collection port. As the stream swirls, working substance vapor is centrifugally forced outward so as to collect in the form of droplets on the inner wall of the separator 26. The droplets run down the wall to the liquid collection port. The oxygen rich stream can be ignited in the turbine chamber 22 associated with combustion, if required. Other fuels are injectable in the oxygen rich gas through injector 22. This process continuously recycles the magnetoadsorbent or an adsorbent dust alone depending on the turbine size. Carbon fiber microtubes can be used as molecular sieves separating water from the hydrogen peroxide; however, the water still needs to be moved.

Once a chemical reaction occurs zeolite dust can be the sole manner of adsorbing the water. When the steam contacts the water saturated zeolite, the zeolite desorbs and passes through a reverse rotation component (like air compressors use to separate water from intake air) separating the dry zeolite dust from the water in the air stream. In this embodiment of the present invention, magnetic materials are not needed in this turbine system if the turbine is engineered properly. Only an adsorbent powder like zeolite is applied. In this case the heat and airflow of the turbine are enough to dry move and separate the zeolite. Smaller systems as referenced need a magnetic manipulation.

Fuel cells generate energy by combining hydrogen and oxygen. As a byproduct, the fuel cell also generates wastewater in the form of liquid and vapor. Many types of hydrogen-oxygen fuel cells exist. Magnetoadsorbents 4 of the present invention are deposited (blown or sputtered) into and removed from the fuel cells wastewater chamber removing wastewater generated by a fuel cell. The water is typically in the form of a warm liquid or a vapor, and by removing the water from the fuel cell, the fuel cell is effectively cooled. As the fuel cell cools, its efficiency is increased, thereby increasing its power output. Furthermore, the magnetoadsorbents 4 increases the efficiency of the membrane typically used in such fuel cells by removing moisture from the membrane. Wastewater on the membrane impedes fuel cell reactions. A further advantage of magnetoadsorbents 4 is that any remaining heat, which is not removed from the fuel cell housing by removing the water therefrom, may be used to supplement desorbing the magnetoadsorbents. This is advantageous for two reasons; increased efficiency of the fuel cell membrane, and reduced power required to cool the fuel cell. Ultrasonic wafers can be integrated as part of the membrane so that when an electric current is applied at certain frequencies the water is ultrasonically driven off the membrane where magnetoadsorbent can then remove the water. This type of wafer morphing membrane provides the technique of opening and losing the exposure of the membrane to enhance the addition and removal of molecules more efficiently. When voltage is applied to a stack of these unimorphic wafers alternately reversed to cure against each other at tangents of the curve, an opening between all the membranes form.

The zeolite powder is passed in the air stream to deliver oxygen and hydrogen to the cell membrane and then remove the water from the wastewater side of the fuel cell. Three species of magnetoadsorbents 4 are required to accomplish these functions; an oxygen, hydrogen, and water adsorbent. Each can be contained within a closed loop of their own to deliver and adsorb each of the above molecules. In a further embodiment of the present invention, a water air-stream separator device is connected in fluid communication with the conduit of a fuel cell that separates the water from dry zeolite powder in a reverse rotation air-stream separator.

Water chilling occurs by applying a floating adsorbent 1 that is magnetic. A more aggressive cooling effect occurs when the magnetoadsorbents 4 are cooled before entering the water and are of the magnetocaloric type. Magnetoadsorbents 4 will remove the latent heat from water, because the adsorbent 1 removes the most polarized water molecules first which are the heated molecules. A magnetic field can be applied to remove the adsorbent 1 with the latent heat in it, leaving an ice or cooled water behind. This instant cooling effect in the water can be used in refrigeration or climate control systems. This cooling system has the advantage of working in an open or closed system and is fast cycling in high volumes. The magnetoadsorbent can be inserted into the tube magnet referenced in this invention to desorb the closed refrigeration system instantly in a few seconds.

Figure 7:
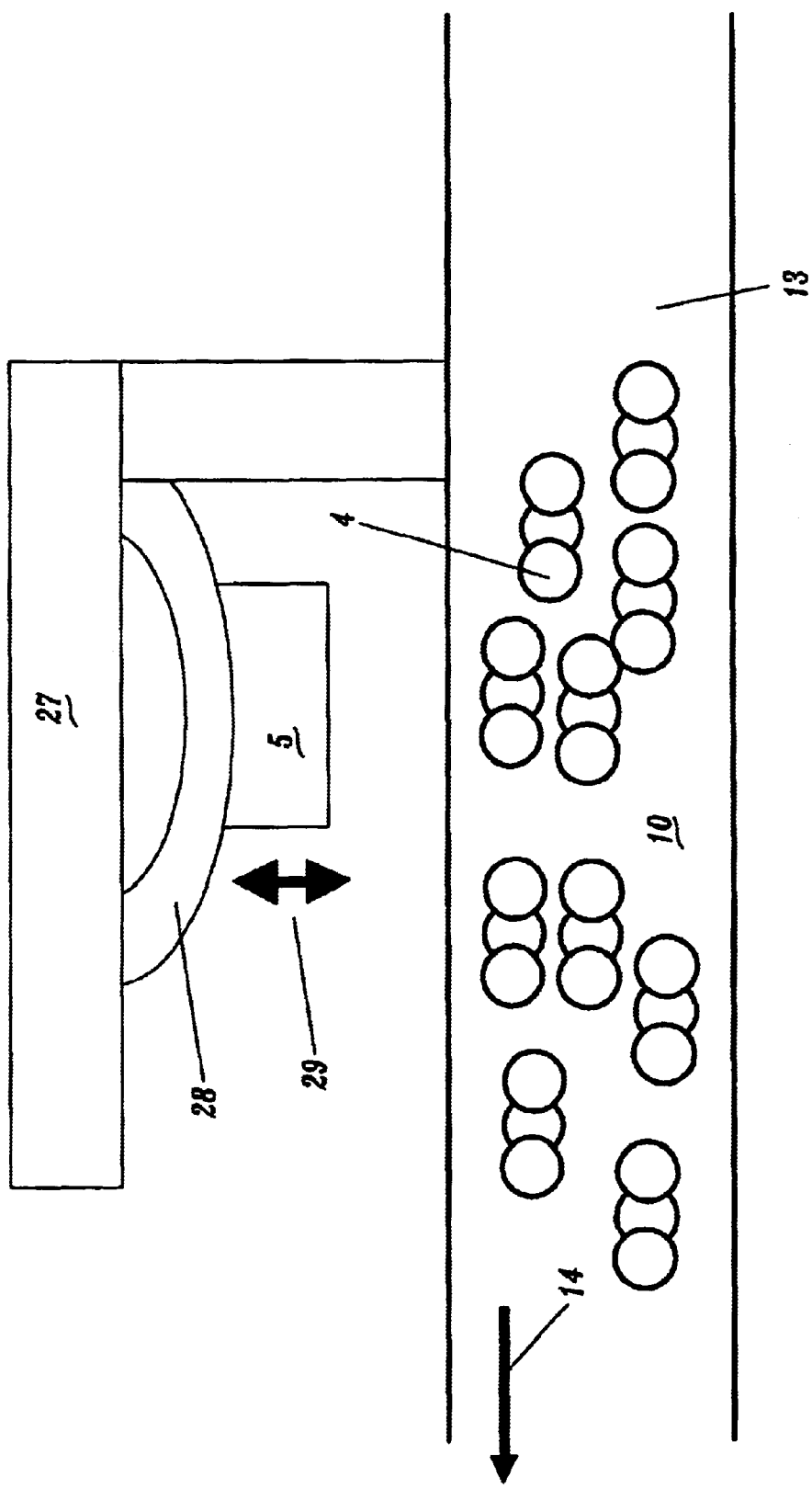
FIG. 7 illustrates a cross sectional view of an embodiment of the present invention comprising a piezoelectric wafer fixed and attached to a magnet that suspends a soft magnetic alloy within a copper conduit.

As shown in FIG. 7, an embodiment of the present invention includes a piezoelectric type wafer driver 28 attached to the comer of fixture 27 and to a magnet source 5 that suspends a the magnetic material 3 in the magnetoadsorbent 4 within a copper conduit 10. Fixture 27 is connected to conduit 10. Thin layer composite unimorph ferroelectric driver 28 (as described in U.S. Pat. No. 5,632,841 to Hellbaum et al., incorporated herein by reference) moves in the direction indicated by arrow 29. This motion occurs when high frequency voltage is applied to the driver 28 vibrating magnet source 5. Preferably, the magnet source 5 is a permanent magnet or electromagnet and the magnetoadsorbent is a rare earth magnet. The motion of a magnet on the outside of the thick copper conduit suspends the magnetoadsorbent 4 in a gas or liquid 13. In a dry state alone the magnetoadsorbent could be uniformly suspended in the conduit by an eddy current effect generated by the moving magnetic field.

As shown in FIG. 8, another embodiment of the present invention including a dry solid film lubricant 30 as the adsorbent 1 bonded by a tough copolyimide 31 to soft magnetic alloy 32, including a magnet 33 holding the lubricant on a bearing surface 35a. Bearing surface 35b is moving relative to surface 35a in the direction of arrow 36. Solid film 34 can be scuffed off and returns as long as it is in the magnetic field of 33. Extra solid film lubricant is available in an area of the field to replace displaced lubricant 34. In various embodiments of the present invention, any one of the moving bearing surfaces is magnetic and any number of shapes is applicable, such as circular concentric bearing, disk, plate, roller, or ball. These could be added to any magnetic bearing system. A preferred material in the present invention is Ford 25D Solid Film Lubricant 3000 CPS and 30000 CPS (manufactured by Sandstrom Products Company under a license from Ford Motor Company). The Ford lubricant is curable directly onto the soft magnetic alloys. These Ford lubricants adsorb oil and water to dry surfaces and enhance the lubrication qualities of the material. Montmorillonite (bentinite) can be coated on the surface of this Ford material where it is desirable to control water layering on the surface for lubrication or shear resistance and adhesion. Montmorillonite has exactly the same resistance to movement as original specifications providing the water content is the same. Montmorillonite based magnetoadsorbents can form very lubricating surfaces or can be aggregated by magnetic relocation into shear resistant surfaces that have exacting repeatability. Applications are in bearings, power transmissions, and motion translational devices.

The capacity of the adsorbent 1 (i.e., the maximum amount of working substance it retains) relative to the amount of working substance in the magnetoadsorbents 4 is an important feature of the present invention. In one preferred embodiment, the adsorbent 1 is MOLSIV Type 13X zeolite, MHSZ-128, or DDZ-70 (manufactured by UOP Inc. of Des Plaines, Ill.) and the working substance is water. In this embodiment, the capacity of the adsorbent 1 is set at a value such that the adsorbent material completely adsorbs water. The adsorbent-to-working-substance ratios and temperatures chosen above were selected to provide the cooling times indicated. Other ratios and temperatures are possible which adsorb and desorb more of the total working substance. Such ratios will reduce the frequency with which the adsorbent material 1 must be desorbed.

As discussed above, in a preferred embodiment of the present invention, the adsorbent 1 is zeolite and the working substance is water. Other working substances and other adsorbent materials, which have an affinity for the working substances, are possible as well. Such working substances include $NH_3$, $H_2$, S, $N_2$, $CO_2$, etc., as well as both fluoro, chloro, and hydrocarbons, and mixtures of the same. These substances have varying affinities for adsorbent materials, as discussed below. Other adsorbent materials include molecular sieves, silicon gel, activated alumina and other similar sodalite type structures, including powders, pellets, particles, solid forms and gels of the same. Montmorillonites, (bentinites) are a flat platelet material alternative.

The external surface area of the adsorbent molecular sieve crystal is available for adsorption of molecules of all sizes, whereas, the internal area is available only to molecules small enough to enter the pores. The external area is only about 1% of the total surface area. Materials, which are too large to be adsorbed internally, will commonly be adsorbed externally to the extent of 0.2% to 1% by weight. Molecular sieves are available in a wide variety of types and forms. By choosing the appropriate adsorbent and operating conditions, it is possible to adapt molecular sieves to a number of specific applications. Not only will molecular sieves separate molecules based on size and configuration, but they will also adsorb preferentially based on polarity or degree of unsaturation. In a mixture of molecules small enough to enter the pores, the less volatile, the more polar, or the more unsaturated a molecule, the more tightly it is held within the crystal.

For example, in one embodiment of the present invention, the working fluid is a mixture of carbon dioxide in natural gas. The carbon fiber more easily adsorbs $CO_2$ than the water. Carbon fiber or carbon fiber tubes are the adsorbent 1 in a preferred embodiment shown in FIG. 1. The carbon fiber is activated for carbon dioxide and forms a fibrous magnetoadsorbent 4 that inherently goes airborne in a gas stream. These magnetoadsorbents 4 are extracted from the natural gas stream by magnetic attraction to magnet source 5. A gas fiberglass or paper filter is used to recover any attrition of fibers. These carbon fibers are positionable magnetically in fluid by the eddy current effect.

In still another embodiment of the invention, the adsorbent material shown in any of the foregoing FIGURES may include carbon fibers, a network of carbon fibers, or a carbon foam material in addition to or instead of other adsorbent materials such as zeolite. In this regard, suitable materials are available from the U.S. Department of Energy, Washington, D.C., as described in U.S. application Ser. No. 08/358,857 to Burchell et al., filed Dec. 19, 1994 now abandoned, and pending U.S. application Ser. No. 08/601,672 to Judkins et al., filed Feb. 15, 1996 now abandoned. The chopped carbon fiber (available from Ashland Chemical of Ashland, Ky.) may be activated to have an affinity for water or other working substances, and may be applied as the adsorbent 1 in FIG. 1. Carbon foam has to be crushed into small pieces in order to be properly utilized in small sieves. Large geometry structures can be applied as well.

As previously discussed, preferably, adsorbents and ferritic metals are bonded by a tough, soluble, and aromatic thermoplastic copolyimide (incorporated by reference above in U.S. Pat. No. 5,639,850). The thermoplastic copolyimide is more resistant to attrition than current bonding materials for zeolites such as polyphenylene sulfide (PPS) or aluminum phosphate. Aluminum phosphate is advantageous as a binder because it adds structural strength by combining activated alumina and/or aluminum oxide with the zeolite and can be heated above 600° F. PPS does not add as much strength but does not require the addition of activated alumina or aluminum oxide, so that 100% of the adsorbent can be zeolite. Any number of binders can be applied as long as a portion of the adsorbent is exposed for adsorption functioning. In the case of the solid film lubricant an adhesive epoxy base is part of the material characteristics. In another embodiment, the hot air is supplied by automobile or truck internal combustion engine exhaust.

A fuel cell generates energy by combining hydrogen and oxygen. As a byproduct, the fuel cell also generates water in the form of liquid and vapor. In one embodiment, the fuel cell is a type FC10K-NC fuel cell (available from Analytic Power Corp. in Boston, Mass.). In other embodiments, other types of hydrogen-oxygen fuel cells are used. The magnetoadsorbent 4 removes the water by adsorption from the fuel cell in a process substantially similar to that discussed with reference to FIGS. 3 and 4.

An advantage of the embodiment of the magnetoadsorbent 4 shown in FIG. 3 is that the magnetoadsorbent 4 removes wastewater generated by a fuel cell. The water is typically in the form of a warm liquid or a vapor, and by removing the water from the fuel cell, the fuel cell is effectively cooled. As the fuel cell cools, its efficiency is increased, thereby increasing its power output. Furthermore, the heat transfer apparatus increases the efficiency of the membrane typically used in such fuel cells by removing moisture from the membrane. A further advantage of this embodiment of the magnetoadsorbent 4 is that any remaining heat, which is not removed from the fuel cell by removing the water therefrom, may be used to supplement desorbing the magnetoadsorbent 4. This is advantageous because it increases the efficiency of the fuel cell and reduces the power required to cool the fuel cell.

In a preferred embodiment, the ferromagnetic material 3 is gadolinium. In other embodiments, the ferromagnetic member is composed of any ferromagnetic material or other material, which exhibits a magnetocaloric effect (i.e., which has the property of heating up when placed in a magnetic field and cooling down when removed from the magnetic field). The magnetic characteristics of gadolinium are described in an article entitled "The Ultimate Fridge Magnet," *The Economist*, Apr. 19, 1997, at 81.

The ferromagnetic member heats up, desorbing the working substance from the adsorbent 1 shown in FIG. 1. When the magnet source 5 is positioned such that the ferromagnetic material 3 shown in FIG. 1 is moved outside the magnetic field in deposit region 8 shown in FIG. 3, the ferromagnetic member cools, cooling the adsorbent 1 in preparation for another adsorption cycle.

In yet a further alternate embodiment, a plurality of ferromagnetic materials 3, each capable of cycling between different temperature ranges, are used to increase the heated temperature and/or decrease the cooled temperature of the zeolite. An advantage of the ferromagnetic material 3 is that it very quickly heats and cools the adsorbent 1, reducing the time required to adsorb and cool the adsorbent vessel in preparation for another adsorption cycle. A further advantage of the ferromagnetic material 3 is that it reduces the power required to both heat and cool the adsorbent vessel 4. Ferromagnetic materials 3 have never before been used to cool or heat adsorbents. Isolated pinpoint heating or cooling occurs.

In another preferred embodiment, a plurality of magnets are employed. Magnets can be assembled in a tube form, by assembling shaped magnets in an orientation to direct the field toward the center of the magnet assembly, making one Tesla MGOe of power in a central hole, approximately 1 inch with a tube OD of 8 inches, and 8 inches long. A plastic pipe is inserted in this tube to prevent moisture from entering the magnets and a conveyer forces magnetoadsorbents 4 through the magnet pipe separating the water from the adsorbent 1 by the magnetocaloric effect. Any known technique can be used to force magnetoadsorbent 4 through the high-energy magnetic tube. If an electric insulating tube (like plastic) is used, then a second electrically conductive tube can be inserted that is separated axially into two electrodes. These two electrodes will generate an electric current when a saturated magnetoadsorbent 4 is forced through the tube magnetically separating adsorbates from the ferromagnetic adsorbent. Magnetoadsorbents 4 will adsorb at a sonic velocity and returned to the entrance of the tube.

Any strong magnetic field source can be used. Further, subjecting the ferromagnetic member to a strong magnetic field (e.g., the magnetic field generated by a superconducting magnet), increases the heating and cooling effect generated by the ferromagnetic magnetoadsorbent.

Figure 9:
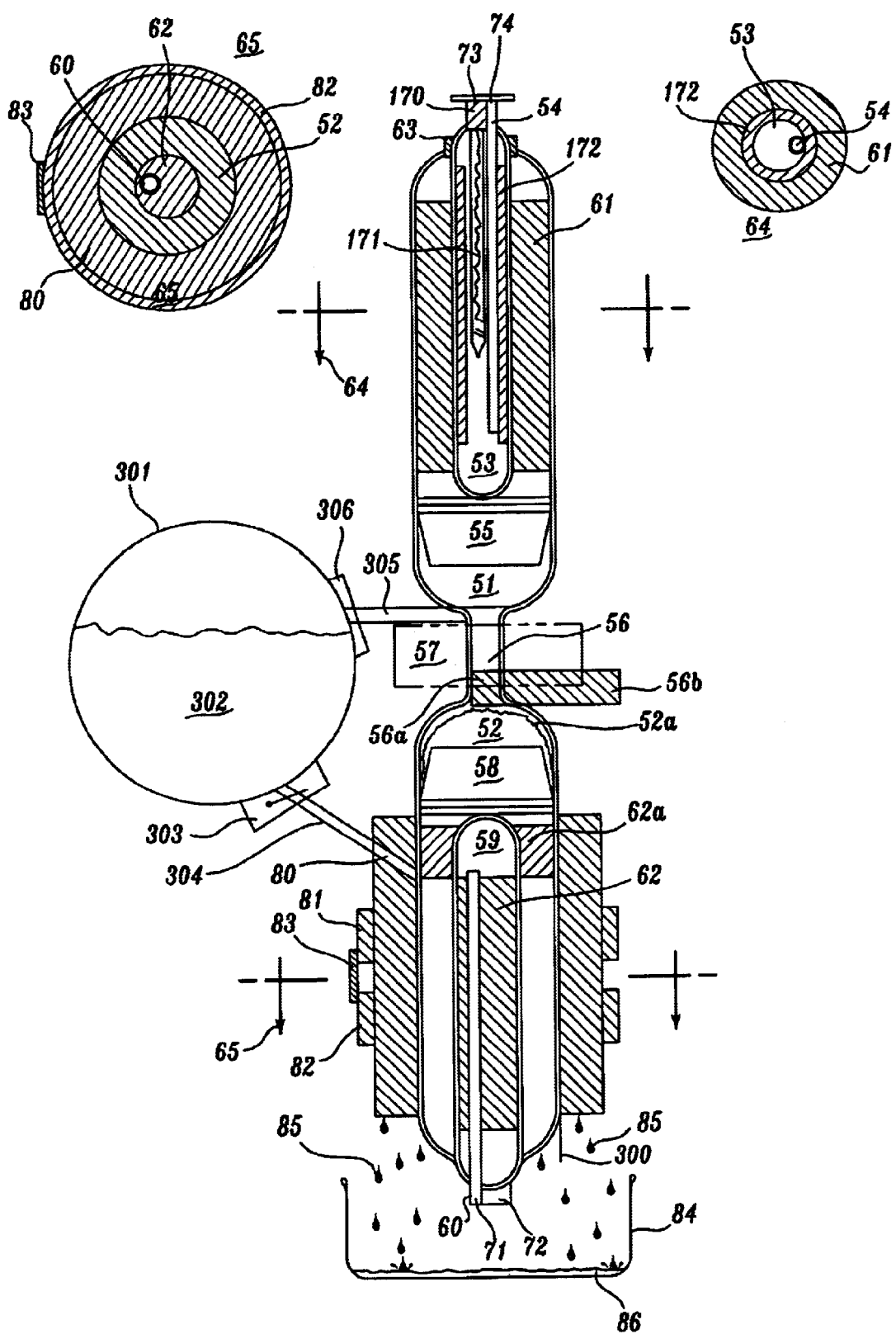
FIG. 9 illustrates a cross sectional view of a refrigeration system including two vacuum vessels and an adsorption vessel containing electrical swing carbon fiber that is connected by a conduit to a desorption vessel containing carbon foam for increased thermal exchange, a conduit system to isolate fluid, and carbon fiber on the cold side exposed to the atmosphere to adsorb moisture from the open air for water collection by electric swing desorption.

As shown in FIG. 9, an adsorbent refrigeration system 50 (described in U.S. Pat. No 5,813,248 incorporated herein by reference) includes two vacuum vessels, and an adsorption vessel 51 containing electrical swing carbon fiber 61 that is connected by conduit 56 to a condensation vessel 52. The condensation vessel 52 contains carbon foam 62 for increased thermal exchange, and conduit system isolation vessels 53 and 59 to isolate fluid for thermal cycling. Isolation vessel conduits 54 and 60 provide fluid flow for isolation vessels 52 and 59. The carbon fiber monolith 61 (referenced above) is bonded to zeolite powder 69.

The embodiment of the present invention shown in FIG. 9 replaces the vessels in U.S. Pat. No. 5,813,248. Further, the embodiment of the present invention shown in FIG. 9 is superior to the prior art, because vessels are within vessels sealed by a concentric vacuum seal. This "vessel within a vessel" approach minimizes stress on the vessels and seals as thermal shock and movement of the vessels occurs during cycling. The faster and deeper the thermal highs and lows are the more efficient the system. These vessels are suspended from each other, so that as the vessels grow, contract and move, minimal stress will occur on the vessel walls or seals.

Figure 10:
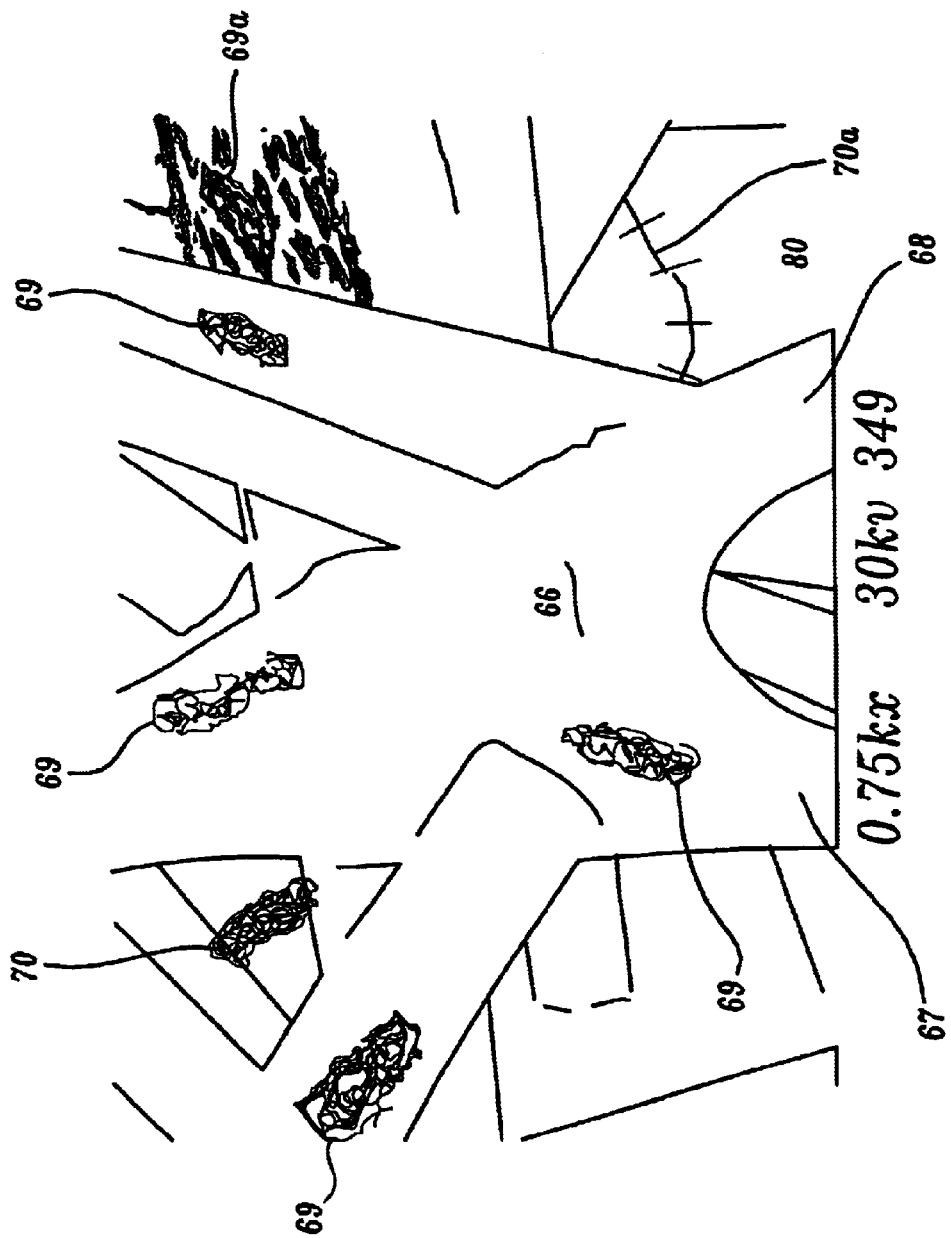
FIG. 10 illustrates a perspective view of a carbon fiber bonded to adsorbents.
Figure 11:
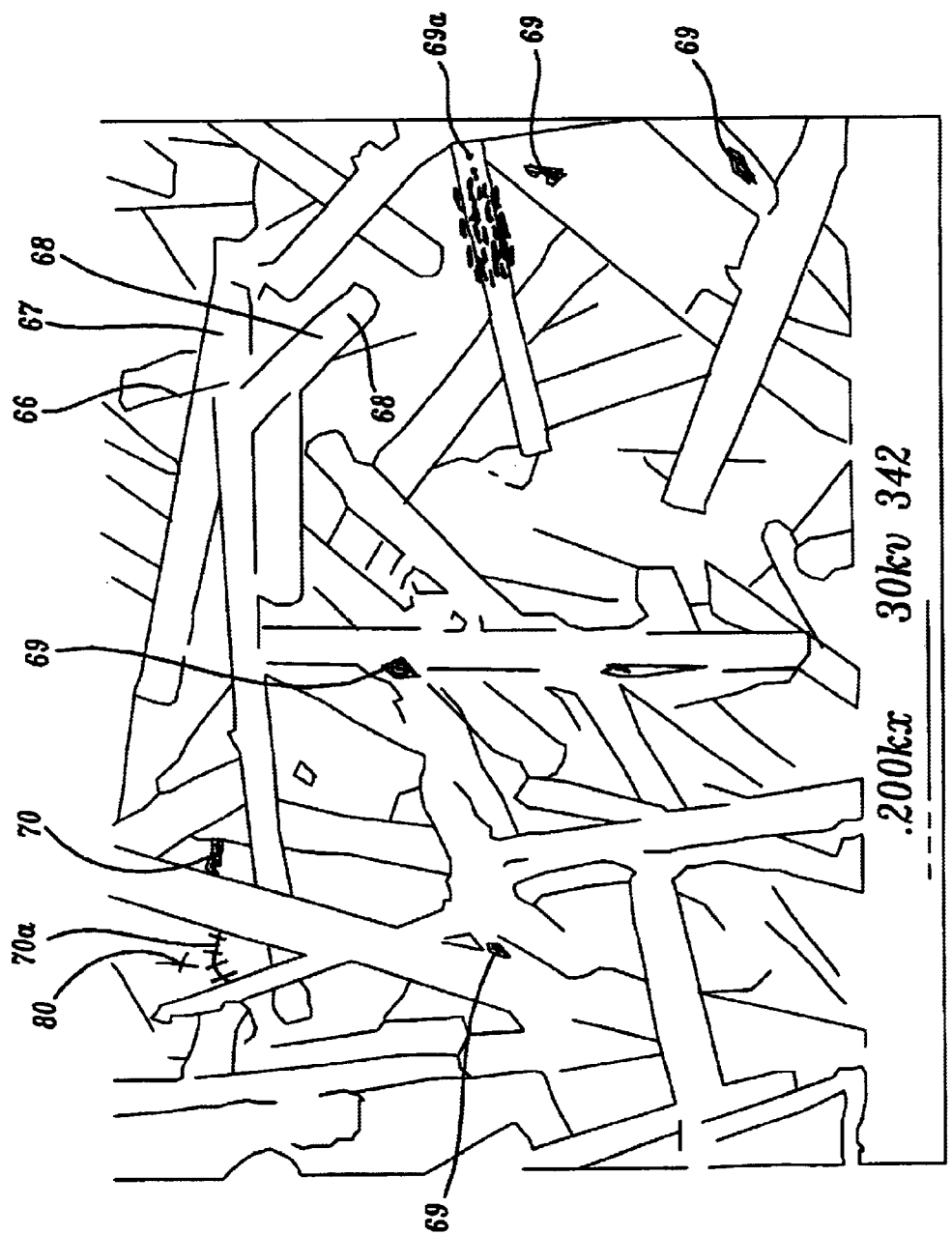
FIG. 11 illustrates a perspective view of a carbon fiber in FIG. 10 bonded to adsorbents with less magnification.

FIGS. 10 and 11 shown the carbon fiber monolith 61 of FIG. 9 with zeolite adsorbents 69 bonded to individual carbon fibers 67 and 68. A carbon fiber carbon bond 66 makes the monolith electrically conductive throughout the carbon fiber monolith and bonds carbon fibers 67 and 68. Zeolite 70 is bonded across a void in the carbon fiber monolith 61. Passing an electric current across the monolith, heating or electrically desorbing, desorbs the carbon fiber monolith 61, with integrated zeolite. Carbon monoliths can be processed to adsorb different gases and zeolite powder bonded to the carbon fiber, and also can be selected for a wide variety of molecules providing a multiple of molecules (like carbon dioxide) for the carbon fiber and water, and for the zeolite.

As shown in FIG. 9, a glass electric insulated ring 63 is inserted between the isolation vessel 53 and adsorbent vessel 51. The glass (or other electrically insulating) insulated ring 63 electrically isolates isolation vessel 53 and adsorbent vessel 51 providing a vacuum seal for the life of the vessels and turning vessels 53 and 51 into electrodes bonded to the carbon fiber monolith 61.

FIGS. 10 and 11 also show the carbon fiber monolith 61 of FIG. 9 with zeolite substituted with montmorillonite as adsorbents 69 and 69a bonded to individual carbon fibers 67 and 68. Zeolites cannot physically attract, as much water because their physical shape is typically spherical closing the cat ions to the water. Montmorillonite on the other hand are flat platelets with fully exposed cat ion sites. (Montmorillonite is available from WYO-BEN, INC. mining company, 550 South 24th Street West, Suite 201, Billings, Mont. 59103.) Montmorillonite is from the smectic family of minerals.

Montmorillonite is often times referred to as bentonite, however bentonite is 85–95% montmorillonite. Montmorillonite is a very flat thin platelet mineral ranging from approximately 2 microns to 10 microns measured across the surface area, including clusters of crystals that range larger but break down into the smaller size ranges. Montmorillonite is negatively charged along the plane of its largest flat surface and positively charged along its narrow edges. Sodium and calcium are the dominant cat ion on montmorillonite surfaces. Water will layer across the flat negative surface of the montmorillonite in a crystalline arrangement with the positive oxygen of the water contacting the negative surface. The hydrogen will point out away from the surface and join to oxygen of other water molecules, where this layering continues until as many as 100 layers can accumulate. Water can layer on the montmorillonite surface 500% to 1100% the mole weight of the montmorillonite increasing the volume of the saturated montmorillonite by 10 to 15 times. Montmorillonite surface area is 800 to 1000 square meters per gram, in contrast to zeolites which in the low range of 35 to 350 square meters per gram. Montmorillonite is a closer match to the carbon fiber surface area of 1000 square meters per gram.

Carbon fiber is treated with an oxygen or ozone gas under heat to make the carbon hydrophilic. The hydrophilic carbon fiber will bond to the montmorillonite. This natural physical attraction of the montmorillonite for the carbon fiber provides a novel and new adsorbent species. In accordance with the present invention, the montmorillonite wraps around the carbon fiber monolith forming a coating layer mechanically bonded montmorillonite to montmorillonite as it wraps around the carbon fiber and forms a natural bond to the carbon fiber surface. Water is the base adhesive and provides the thermal growth difference between carbon fiber and montmorillonite without breaking the movable water bond. Other binders just break of with thermal expansion differences making water montmorillonite bonds unique.

Montmorillonite is suspended in water, or an organic liquid such as alcohol-based liquids to apply the montmorillonite platelets to the surfaces of the carbon fiber deep into the monolith. A balance between water and montmorillonite platelets is important to maintain a void air passage way throughout the water saturated montmorillonite carbon fiber monolith. Montmorillonite also forms "T" bonds, where the positive edges bond montmorillonite perpendicular to each other forming structure that will not fall out of the carbon fiber monolith. Montmorillonite when water saturated is also very electrically conductive providing a carbon fiber montmorillonite coated adsorbent monolith that exposes the surface area of the montmorillonite to vapor or gas through voids 80. Void 80 exposes montmorillonite to all the gas, vapor, or liquid around it.

Montmorillonite alone makes a poor adsorbent, because layering of water on the montmorillonite surface and stacks of montmorillonite layered on top of each other prevents adsorption to internal montmorillonites. Desorption and adsorption has to occur as rapidly as possible to cycle the system since montmorillonite layers form a resistant membrane. In accordance with the present invention, a carbon fiber monolith 61 provides a high surface area that is a highly electrically and thermally conductive base material to apply montmorillonite, which is more desirable than carbon fiber alone, because montmorillonite increases the kinetic rate of adsorption and water adsorbing capacity.

A carbon fiber carbon bond 66 makes a monolith that is thermally and electrically conductive throughout the carbon fiber monolith, as viewed in FIGS. 10 and 11, and bonds carbon fibers 67 and 68. Montmorillonite 70a is bonded across a void in the carbon fiber monolith 61. Passing an electric current across the monolith, heating or electrically desorbing, desorbs the carbon fiber monolith, with integrated montmorillonite. Carbon monoliths are processed to adsorb different gases, and montmorillonite bonded to the carbon fiber is selected for a wide variety of molecules providing a multiple of molecules (like carbon dioxide) for the carbon fiber and water, and for the montmorillonite.

Referring again to FIG. 9, a glass electric insulated ring 63 is inserted between the isolation vessel 53 and adsorbent vessel 51. The glass insulated ring 63 electrically isolates isolation vessel 53 and adsorbent vessel 51 providing a vacuum seal for the life of the vessels and turning vessels 53 and 51 into electrodes bonded to the carbon fiber monolith 61. In some embodiments the carbon fiber monolith 61 is substituted with other carbon fiber in cloth, wound, or bundles. Carbon fiber can also be hydrophobic without departing from the scope of the present invention, but less montmorillonite will form around the fiber. In still further embodiments the carbon foams, aluminum open cell foams, copper or other metal form and micro wires, sintered metals, and polymers or polyimides are coated with montmorillonite to approach the surface area of the carbon fiber monolith, but none are a close a surface area match as carbon fiber monolith with a relative air passageway structure. Carbon fiber is substituted with micro carbon tubes in other preferred embodiments of the present invention. Montmorillonite hold the water in position providing a units that will function the same in any position.

As shown in FIG. 9, in some embodiments a montmorillonite is placed in vessel 52 without the carbon foam or fiber or integrated in them. The montmorillonite water content is balanced so the layering of water on the montmorillonite is so thick the outer water molecules have a very week attraction. These weaker outer layers are already in an expanded ice type crystal formation so when ice sublimation occurs the saturated montmorillonite will shrink rather than expand like ice alone. This prevents the ice from developing heat spike due to the expansion of ice against a hoop stress resistant vessel wall. In a preferred embodiment, the montmorillonite is applied to the carbon fiber monolith or other fibers here as well as the desorption vessel 51. In still other embodiments, the vessel 52 is replaced with adsorption/desorption vessel 51 and a water balance is provided that allows a continuous freezing cycle as each vessel desorbed in alternate cycles.

As shown in FIG. 9, carbon foam 62 is inserted in the condensation vessel by bonding agents that will not outgas and are thermally conductive. These carbon foams are formed in the vessel 52 at the time of production providing a bond directly to the copper. These carbon materials are applied anywhere on the outside of the vessels or inside where greater heat exchanger capability is desired.

Vessel 52 is an ideal vessel to fill full of carbon foam in contact with working fluid in the hard vacuum within copper vessels 51 and 52. Carbon foam will not directly bond to aluminum without a bonding agent. The carbon foam increased surface area makes the ice sublimation process occur quickly. Carbon foam also thermally cycles any other fluids quickly. By bonding the carbon foam 62 between isolation vessel conduit 60 and isolation vessel 59 thermal exchange occurs between them by way of a fluid passing through the vessel 59. Fluids pass through ports 71 and 72.

Ports 71 and 72 are interchangeable as intake or exhaust ports. Ports 73 and 74 carry and isolate fluid to heat exchangers to remove heat from the hot side of the process. Additionally, hot fluid is cycled into vessel 53 for desorbing if that type of fluid heat source is specified. In a preferred embodiment of the present invention, a halogen light socket 170 with halogen light 171 is inserted into vessel 53 for a heat source. Carbon foam or fiber tube lining is inserted in vessel 53 with a socket 170 for the halogen bulb.

Carbon foam is black and has a great surface area converting light energy to heat and conducting the heat from the light to the adsorbent materials within the vessel for desorption. In some embodiments lights are internalized within the unit (but in this configuration the vacuum vessel 51 has to be broken open to service the light/heat source). In still other embodiments, other heat sources are applied, but light heat sources converted to heat by carbon foam are the easiest most economical heat source.

A clip on halogen light is used easily, if the copper vessel 53 is used as one side of the light electrode. Any light can be used without departing from the scope of the present invention. (A preferred size configuration used in this size invention is halogen light model number E11 JD 250 from the WAC Lighting Company of China, store Universal Product Code 7 90576 00603 110–130 v AC 250 w.) A range of lights can be applied in the socket 170 to match the power source from 12 volts in an automobile, 24 volts in a truck or tractor, 50 volts for Europe, 220 volts for industrial. By changing the light and plug adapter to each country or application (e.g., a cigarette lighter adapter for a car), this system can be applied anywhere and be very mobile. These voltage changes are easily adapted to by placing a light inside vessel 53. The radiated heat from this light has to pass through the adsorbents to exit the vessel providing a system with minimal losses to the environment. The carbon foam provides the maximum heat adsorption by converting the light to heat adding the natural radiant heat of the light. A 50 watt bulb will desorb 140 grams of UOP zeolite in about one hour. The trapped heat exits only through the adsorbents as a path to the outside of the vessel.

Referring again to FIG. 9, in a preferred embodiment of the present invention, a vessel 53 is replaced with a cartridge tubular heater (manufactured by TruHeat Corporation, 700 Grand Street Allegan, Mich. 49010-0190, USA). Copper sheathing is the preferred material if 350° F. is the limit of temperature to which the material will be submitted. Higher quality copper alloys are selected for higher temperatures as well as incoloy, steel, glass, and ceramic. Flexible silicone based heaters are inserted into vessel 53 and externally around vessel 55. In some embodiments, the vessel 55 is transparent glass or transparent polyimide (discussed above) providing solar heat adsorption into the desiccant materials. These glass transparent tubes have a tube half transparent and half light reflective rotated around the tube that covers and uncovers the transparent tube cycling the system. In some embodiments, a thermally conductive material is rotated around a copper vessel to heat and reflect light as well to provide solar energy.

As shown in FIG. 9, everything that is in vessel 51 is duplicated in vessel 52 including the adsorbent materials. Carbon foam 56a is inserted into conduit 56. As the units are cycled, one vessel 51 or 52 adding heat, and the other being cooled; carbon foam 56a traps and freezes water. Carbon foam 56a transfers through the conduit 56 into external carbon foam heat exchanger 56b. This cycling system is constant and carbon foam 56a and 56b provide the heat exchanger surface where freezing will occur. This is a very stable temperature which is desirable for cooling computer components by contacting carbon foam 56b or the outside conduit 56. Carbon foam tube 62a is inserted around vessel 59 and on the inside wall of vessel 52 to provide a vapor trap and freezing heat transfer region that is localized and easier to remove heat from. In some embodiments, carbon fiber 80 is replaced with carbon foam to complete a thermal path between vessel 59, and vessel 52.

Carbon fiber 61 in vessel 51 can also be carbon foam (other foams ceramic aluminum, copper, etc.) with zeolites or adsorbents bonded to the carbon foam, without departing from the scope of the present invention. This carbon foam is very porous providing the ideal surface area for bonding zeolite adsorbents. There have been previous attempts to bond zeolites to the inner walls of tubes for chilling. In these attempts, the volume of zeolite was low compared to the pipe being used. Additionally, in these attempts the zeolites could not be properly bonded to the pipe surface; either the bonding agent was too thin and did not hold the zeolite, including clogging the molecular sieve surfaces, or the bonding agent was too thick and did not flow into the tubes surface irregularities. These attempts used a bonding agent that required scuffing off the surface area of the bonding agent in the tube to provide an adsorbent surface area. No advantages were achieved in these prior efforts when bonding to carbon foam or carbon fibers because both high surface area materials are also porous and do not need special unique binding methods. However, in accordance with the present invention, binding to carbon fiber and carbon foam heat exchanger surfaces provides multiple the necessary surface area of zeolites to which to bond.

In the case of carbon fiber this surface area is greater than 1,000 square meters per gram of surface area. Carbon foams and aluminum foams range widely in density based on the gas pressure or vacuum applied during their manufacturing, but the foam is reticulated and fluids and gases can pass through the foams. These carbon foam surface areas are similar in size to the carbon fiber when comparing the surface area of a tube, whether the tube was finned or provided capillary size fins. Only a few square feet of surface are present in a 2 inch diameter by 4-foot tube. The same tube filled with carbon fiber or foam coated with zeolite would have several miles thousands of square meters per tube. These surface areas are not calculating in the zeolite surface area. The UOP tubes finned or not are not very high surface areas, when compared to carbon foam and fibers. The carbon fiber has the added advantage of being electrically conductive to desorb the zeolite bonded to it. The ring seal 63 is vacuum tight, thermally stable, and moldable, but not electrically conductive.

A line of innovative insulation technologies have been developed based on polyimide foam, which can be foamed in place for installation and repair—dramatically saving labor and material costs. The low-density foam can be processed into neat or syntactic foams, foam-filled honeycomb or other shapes, and microspheres. These products offer excellent thermal and acoustic insulation and high-performance structural support. The low-density foam can be processed into neat or syntactic foams, foam-filled honeycomb or other shapes, and microspheres. These products offer excellent thermal and acoustic insulation and high-performance structural support.

Referring again to FIG. 9, an insulating polyimide foam coating 52a is bonded to the inside of the vacuum vessel providing compressible material. This foam sphere can have a magnetic particle trapped inside providing the ability to move the insulation material around in the vessel exposing the vessel to thermal transfer or insulating the vessel. The outside of this polyimide foam sphere can have montmorillonite bonded to it for localizing (layering) where the ice forms by locating at the water moisture. Phase change pirolites can be inside the foam spheres where storage and release of thermal energy needs to be moderated. Pirolite filled spheres act as buffers delaying when heat will transfer. If ice pressure forms in the vessel the insulating foam coating 52a provides insulation between the ice forming in vessel 52 and the ice. This is important to isolate the heat transfer to only the regions in the system that it is desirable to conduct through. It is desirable, for example, to have high thermal conductivity through vessel 59 and carbon foam 62, where fluid passes through from the outside. When using vessel 59 as the heat transfer method it is undesirable to lose heat anywhere through the inner wall of vessel 52. Magnetoadsorbents can be moved around in the desorption/adsorption vessel as well to eliminate the need for screens and increase the efficiency of the system by moving the magnetoadorbent in front of and away from a constant heat source like solar energy or a waste heat stream.

In some embodiments, the polyimide foam is applied as the insulation around the ice sublimation system. The polyimide foam is easily applied to any shaped surface like the inside walls of vessel 52, because it can be applied directly on the walls as bonded foam. Carbon foam will further isolate where heat exchanges will occur, because it is the path of least resistance and has the greatest surface area. Inside the refrigeration unit there is a need for foam where the ice expands and can break the vessel. This polyimide foam offers a wide range of densities providing two functions in this invention.

The most significant benefit of the polyimide foam is their ability to foam in place during installation and repair. This greatly reduces labor and material waste costs. Other benefits include the following: mechanical performance benefits, low density, highly resilient (low friability), high compressive strength, highly durable (passed 50 cycles at ±400° F.), rigidity, thermal performance benefits, low thermal conductivity from cryogenic to elevated temperatures, low coefficient of thermal expansion, high glass transition temperature, foam-in-place application, in situ repair, flame resistant, low flammability and smoke emissions, nontoxic and nonfuming, chemical, solvent, and hot water, resistant, and low dielectric constant.

Referring again to FIG. 1, in some preferred embodiments of the present invention, magnetic materials 3 are placed inside polyimide foam spheres making the magnetoadsorbent base material. This is beneficial since the magnetic materials can be sealed in the foam (protected from moisture), while the exterior can be the adsorbent bonded surface exposing the adsorbents to the selected fluids or gases. In some embodiments of the present invention, the foam sphere are filled with helium and coated with adsorbent or other biological surface like silicon, or alcohol vinyl based materials. Helium filled polyimide spheres provide floating materials and are the lowest energy materials to manage, because magnetic materials are added to locate the spheres where needed (under fluid or by releasing the magnets the spheres will float out of the fluid). Magnets are bonded in the sphere off center so the sphere can be rotated and held in an oriented position exposed and part dipping in solution. Any position can be calibrated in gently rotating spheres.

These spheres are preferable for removing fresh water from salt water, because the sphere will float out of the saltwater with only fresh water in the zeolite (water specific) type adsorbents. In addition, helium magnetic filled spheres accelerate at a greater speed than spheres without helium gas, because the Bernoulli effect converts lift to forward thrust in the direction of acceleration. These spheres are bonded to a variety of materials and are designed to just suspend in the air loosely while pathogens, DNA, RNA, or other biological based systems grow on the surfaces. This is a very gentle controllable system with no energy applied to achieve an air buoyant suspension of the growth or adsorbent spheres. These are buoyant in both water and air. Water buoyant only spheres are also provided with substantially only air in the spheres.

This process can produce foam and microsphere materials by reacting a derivative of a dianhydride (e.g., ODPA, BTDA, PMDA) with a diamine (e.g., ODA, PDA, DDS). An admixture of two or more polyimides can be combined or used separately to make a variety of polyimide foams with varying properties. Foams and microspheres can be fabricated to specific densities from 0.5 to over 20 pounds per cubic foot. (NASA and Unitika have named their insulation materials TEEK.) =p Referring again to FIGS. 10 and 11, carbon fiber monoliths are inserted and wired in conduits or batch vessels in sections so fluid flows through the conduit and substantially does not contact the carbon fiber monolith. Fluid fills part of the conduit and substantially the rest of the conduit is the open carbon fiber monolith. Pressures and temperature can be changed to control rates of adsorption within the conduit without departing from the scope of the present invention. As working fluid like a solvent is passed through the bottom of the conduit, the upper carbon fiber bonded to the upper ceiling of the conduit adsorbs selected molecules (such as water), out of the fluid.

In accordance with the present invention, magnetoadsorbents 4 are dropped in the fluid of this type of conduit and simply be lifted to the top of the conduit where there is no fluid flow, providing the removal of selected for molecules.

This is a simple partially full conduit that provides fluid flow and enough of a void at the top of the conduit for adsorbent to collect saturated adsorbent. In other embodiments, the magnetoadsorbent 4 are vacuumed or physically removed from the conduit between fluid flow process cycles to be desorbed (unless desorption is performed at the top of the conduit while holding the magnetoadsorbents 4 in place).

New adsorbents are engineered and supplied on an ongoing basis. Adsorbent suppliers advertise commercially that custom-engineered adsorbents are available. New metal alloys are also being developed on a regular basis. Magnetic polymers are being developed for industry. Injected molded polymer based magnets are available from Virginia Power (NASA developed) of Richmond Va. It is to be understood that the selections of an adsorbent for a specific application, in combination with the materials that are moved under a magnetic field, are within the scope of this invention. Users can engineer a wide variety of adsorbent functions into magnetoadsorbents 4. Adsorbents 1 can be grown onto the metal alloys 3. (UOP part DDZ-70 type zeolites are grown on the carbon fiber as shown in FIGS. 10 and 11.) Further, adsorbents 1 like zeolites can be grown directly onto the soft magnetic alloy 3 or other alloy, eliminating the need for a specific binder between the adsorbent and magnetic alloy or alloy, without departing from the scope of the present invention. These zeolites attached to the carbon fiber are used to release molecules later than the carbon fiber desorbs molecules.

Referring again to FIG. 9, in some embodiments of the present invention, the vessels 51 are filled with zeolite pellets, beads or powders, including zeolite powders exposed on carbon foam monolith that have to be thermally cycled. Carbon foams with bonded zeolite are integrated in the material during foaming, or grown to the surface of the monolith. The vessel can be open or closed if applied in other cycles requiring open systems during a portion of the processing time. In some embodiments of the present invention, a valve is inserted in valve area 57, between the vessels, to store the energy potential of the fluid accumulated in condensation vessel 52. When the valve is opened substantially 100 percent of the potential energy is recovered.

Referring again to FIG. 9, in a preferred embodiment of the present invention, magnetocaloric materials are bonded to the adsorbents inserted in vessel 51 and held by screen 55 instead of a monolith adsorbent. A magnetic field is applied to the outside of the vessel 51 to increase the temperature of the adsorbent bonded to magnetocaloric materials. A series of different magnetocaloric materials that operate in different temperature ranges when in varying magnetic fields can be inserted in one vessel or separated into several vessels to drop the working fluid to cryogenic levels. Increased heating is accomplished in the same way by providing a series of different magnetocaloric alloys that operate at a different range relative to the magnetic field applied. Carbon foams or loose magnetoadsorbents have different alloys bonded to them for a range of cascading temperatures desorbed relative to magnetic field strengths applied. Different magnetocaloric alloys operate in different temperature ranges. One magnetoadsorbent will have a group of different magnetocaloric materials clustered to it. Magnetoadsorbent with this clustering of bonded magnetocaloric alloys adsorbs molecules in a very low temperature range.

As shown in FIG. 9, vessels 53 and 59 are connected and bonded to vessels 51 and 52 at just one end of the vessel with a vacuum tight seal. Tubes 60 and 54 are connected in the same thermal vessel end. This vessel within a vessel thermal system provides the several end benefits including, but not limited to; thermal vessel expansion and contraction without stressing multiple welds, outside fluid isolation combined with thermal shock of the vessels 53, 51 and 52, 59 during fluid entry, the upper vessels each serve as separate electrodes bonded to carbon fiber sealed by non electrically conductive glass 63, and lower vessel 52 serves as an electrode for carbon fiber 80 with electrode rings 81 and 82 joining them electrically to a common wire. Carbon fiber 80 is bonded to vessel electrode 52 and electrode rings 81 and 82 by conductive adhesive.

Preferably, conductive carbon fiber adhesives selected for this invention are EDM electrode glues (found in most plastic injection molding tool rooms). Other electric bonds like silver, and conductive adhesives can be applied. Water collection pan 84 collects water 86 when water drops 85 fall during the time periods electric current is applied across carbon fiber monolith electrode rings 81, 82, and vessel 52. An ultra capacitor (such as from The Maxwell Company) can be charged by many methods. The preferred source in the present invention is solar voltaic. This water collection system provides significant advantages over the prior art. These include the following: the carbon fiber monolith has greater than 1000 square meters per gram of surface area, is a highly thermally conductive carbon monolith, the carbon monolith is highly electrically conductive, the carbon monolith has been heat treated in a oven with oxygen to make it hydrophilic, and when electricity is applied to desorb the carbon fiber, the water does not heat significantly during desorption.

The carbon fiber 80 is a monolith making a thermal path throughout the open porous hydrophilic carbon surfaces. In accordance with the present invention, during the cycling of a refrigeration system the carbon fiber monolith is bonded to the freezing or cold side of a refrigeration cycle. Preferably this system is bonded to the ice sublimation systems cold side, as discussed with reference to FIG. 9. Since the ice is sublimating in vessel 52, the carbon fiber monolith 80 does not have an electric load through it and reduces to near the temperature of the vessel 52. The due point is reached within seconds and water droplets form on the carbon fiber throughout the monolith.

Electric current is applied across the electric source copper electrode rings 81, 82 through the carbon fiber monolith and grounded through electrode vessel 52, a copper vessel. Alternating or direct current is applied across the carbon fiber and either vessel 52 or the one electrode formed by rings 81, 82 and plate 83, and is the positive or negative electrodes. In some embodiments, the carbon fiber monolith 80 is broken down into several sections, each wired for desorption providing a continuous flow of water. Two or more refrigeration vessels 52 are attached to one or more carbon fiber monolith 80 to provide constant cooling of carbon fiber 80. Preferably, vessel 52 in this invention is approximately 1.5 inches in diameter by 8 inches in length and provides enough heat removal energy to make approximately 7 gallons of water per day in 75 percent humidity at sea level using electric swing desorption carbon fiber in the atmosphere.

This ice sublimation system is efficient because ice sublimation processing moves water vapor from the ice vaporizing to the adsorbents at a sonic velocity, so that no latent heat can form. This aggressive heat ice sublimation provides a freezing source for carbon fiber monolith 80 to extract moisture from the open atmospheric environment. Pathogens will not form on this open monolith, because of the electrical current cycled through it.

There are many regions of the world like Brazil, China, Saudi Arabia, and India with high humidity desert regions where water can be condensed by carbon fiber monoliths at a high rate. This carbon fiber monolith is placed in a vacuum or higher pressures than atmosphere, and connected to a cooling source vessel 52 to increase the efficiency of the fiber 80 adsorption in industrial application where adsorption/desorption is required. A slower rate of adsorption will occur, if the carbon fiber monolith is not cooled. A permanent magnet source is passed over the carbon fiber to cycle it, if there is no electricity. Carbon fiber is bonded to ferromagnetic alloys that exhibit the magnetocaloric effect to reduce this thermal cycle time. Carbon dioxide is a useable working gas.

Figure 12:
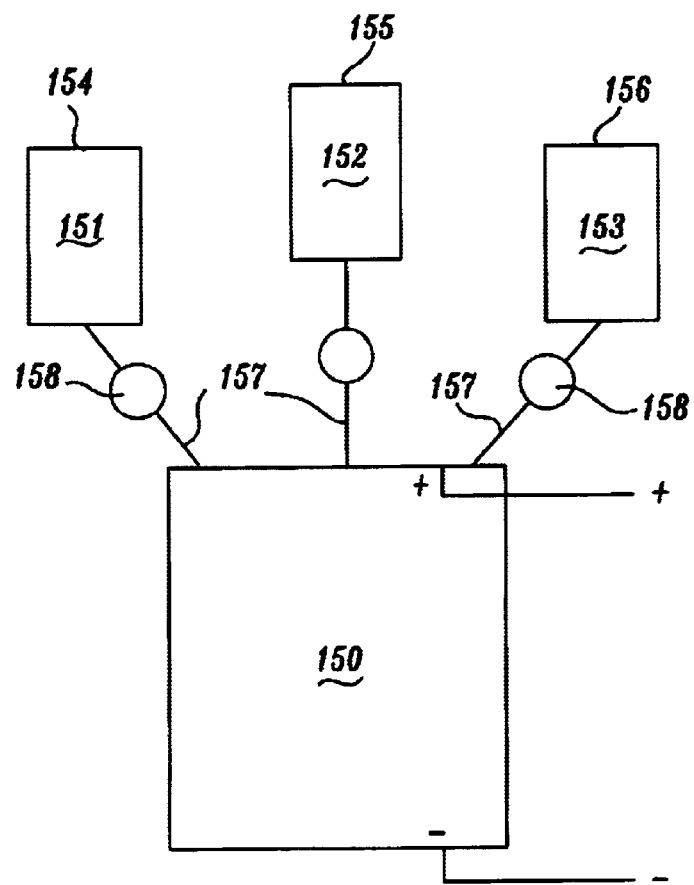
FIG. 12 (on the drawing sheet with FIG. 5) illustrates a carbon fiber monolith in FIG. 11 with odorent supply systems added for odorent distribution for smell reproduction.

Referring now to FIG. 12, a carbon fiber monolith 150 is wired so that an electric load is applied, and the high surface area of the monolith is hydrophilic, thus making carbon molecules physically attracted to it, as well as odorous molecules (smelly carbon-containing molecules). These smelly carbon-containing molecules are adsorbed evenly onto the monolith 150, because they are carbon based and the monolith is all carbon. The human nose recognizes different bits of various odor molecules. A selected set of odorents 151, 152, and 153 in injector vessel 154, 155, and 156 can be injected onto the carbon fiber monolith 150 through injection tube 157. A family of odorents will be stored in one or more injection vessels 154, 155, and 156 to be released when electrically released by valve 158.

The Internet is connecting computers around the world. Sound is provided by speakers, and visual by the monitor. In accordance with the present invention, now smells can be sent across the Internet as a signal to a logic circuit that will drive the carbon fiber smell facsimile—reproducing smell by applying electricity across odorent saturated carbon fiber monoliths. Electricity applied across the carbon fiber is controlled precisely and during desorption the carbon fiber monolith does not heat up changing odorents chemically. Controlling the level of certain types of odorents is beneficial, because the nose receptors recognize some smells by the quantity of odorents in the air. Other odorent species need to be present in order to be recognized. The combination of odorents can trick the nose into believing a certain odor is present. In accordance with the present invention, real odorents, the quantity of certain odorents, and the combination of odorents are desorbed from carbon fiber monoliths electrically to precisely deliver smells to human nose receptor cells. Ultrasonic wafers can be used to drive off the odorent.

Cold air, hot air, moisture, and burning are selectively added to the carbon monolith to make the environment as real as desired. Alternatively, other devices deliver odorents is substitute for the carbon fiber monolith, however, a carbon fiber monolith has the highest surface area, 1000 square meters per gram, to distribute odorents precisely. It is understood that multiple carbon fiber monolith and multiple odorents can be combined to obtain the desired results, without departing from the scope of the present invention. This system is implementable in homes to enhance the TV experience, theaters, stores, or other environments where odorent enhancements are desired. Carbon fiber will heat up and burn organic or chemically change odorent.

Referring again to FIG. 12, an odorent reproduction "copy" system is illustrated. The biological basis of smell is not fully understood. Dr. Linda Buck and Richard Axel at Harvard Medical School published in the Mar. 5, 1999 issue of CELL (incorporated herein by reference) a description of a class of proteins, called olfactory receptors, which are the body's frontline odor detectors. Some receptors are triggered at high concentrations of odorent but not at lower levels. Odorous molecules can have very different smells at different doses. At the nose level it is the combination of receptors, recognizing different bits of various odor molecules, that enables humans to distinguish roses from goats. Olfactory receptors are found on millions of nerve cells lining the nose.

Receptors are thought to sense scents by binding to particular atomic structures on specific odorents—small yet smelly carbon-containing molecules. Combinational coding of smells is used over and over in different patterns to compose a vast vocabulary of odors. A single receptor can be triggered by more than one odorent, and a single odorent can activate more than one receptor. Furthermore, as some receptors are triggered at high concentrations of odorent but not all lower levels, which may explain why odorous molecules can have very different smells at different doses. In accordance with the present invention, carbon fiber or a magnetoadsorbent 4 can be used to adsorb/desorb odorent, including odorent removal from the air after use, to obtain clean air.

Figure 13:
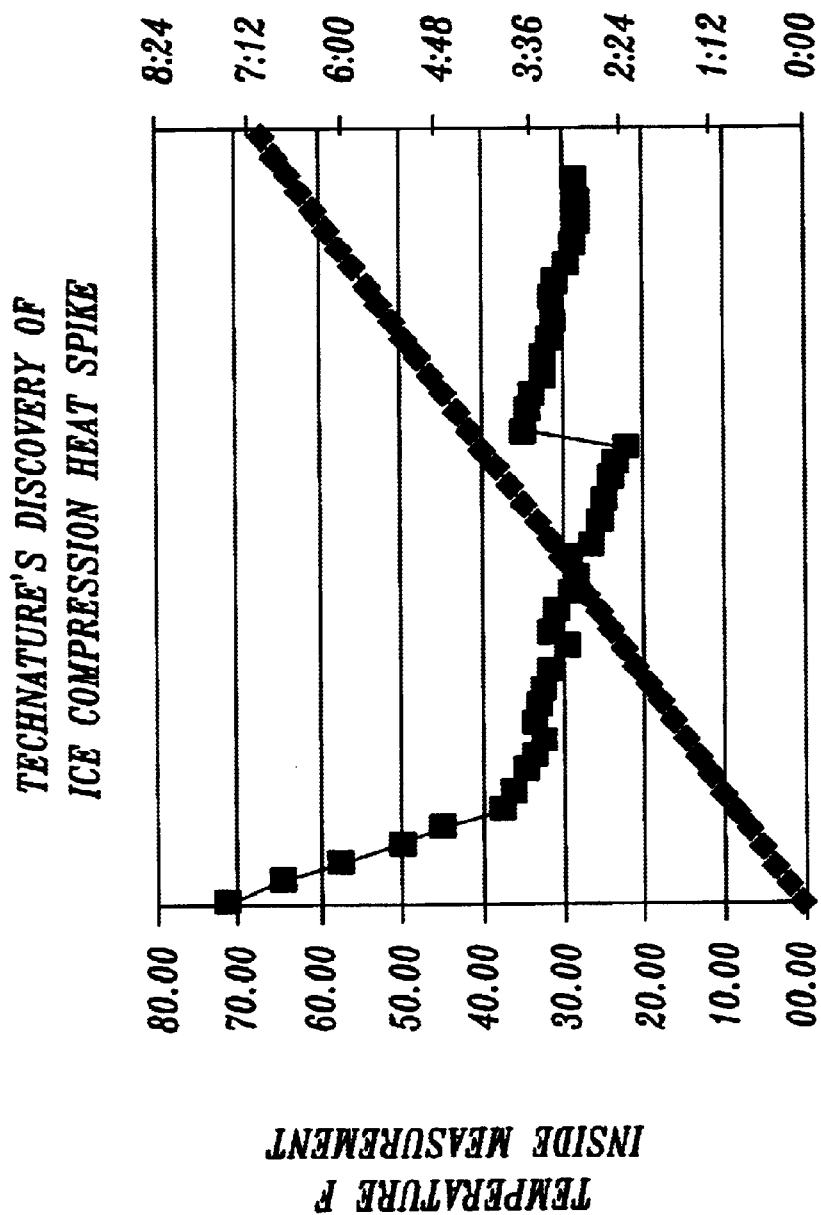
FIG. 13 illustrates a chart of ice sublimation heat spike curves in an empty ice sublimation vessel measured from the inside center of the vessel.
Figure 14:
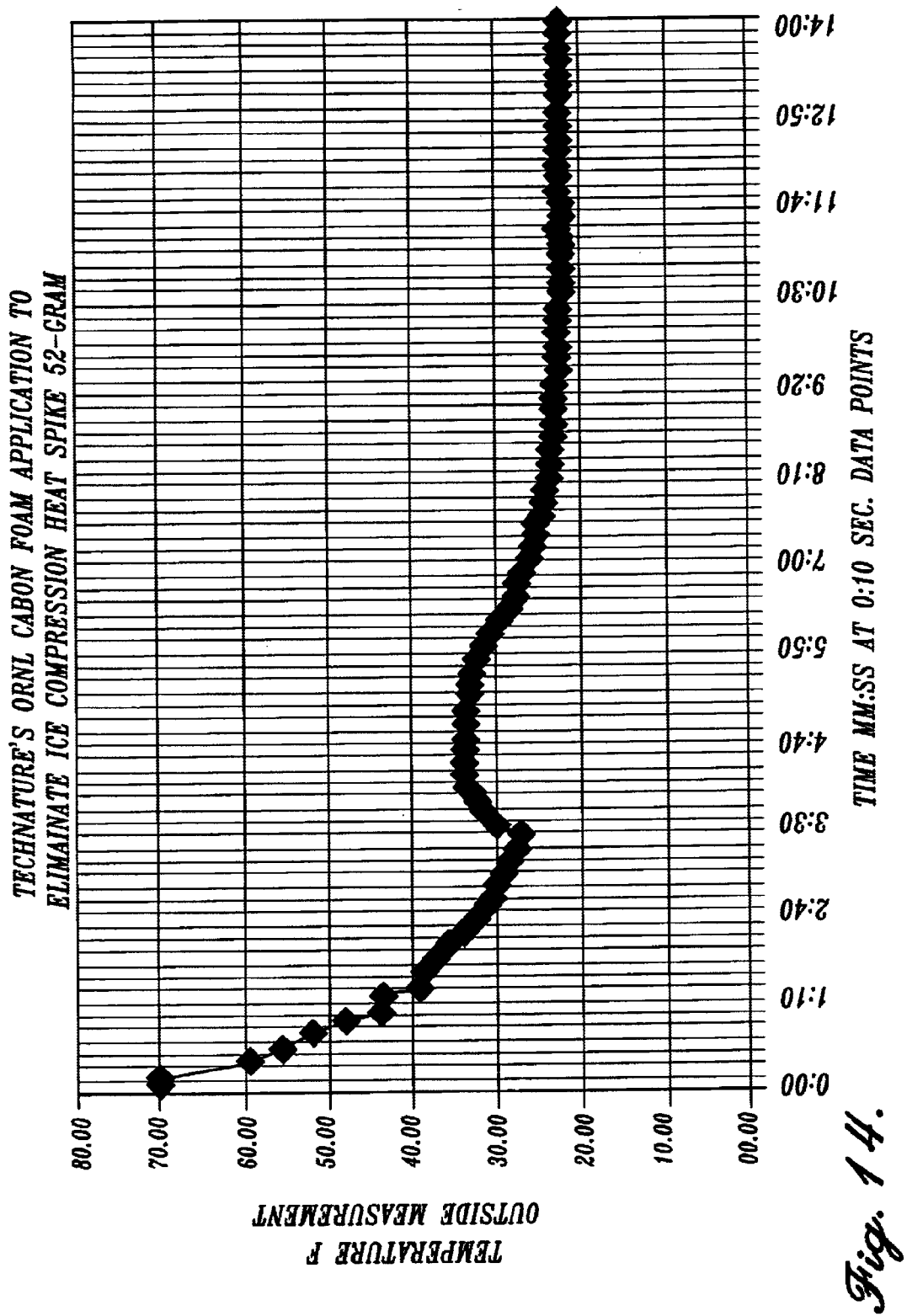
FIG. 14 illustrates a chart of ice sublimation heat spike curves in an empty ice sublimation vessel measured from the outside of the vessel wall.

FIGS. 13 and 14 show charts of ice sublimation heat spike curves in an empty ice sublimation vessel constructed in accordance with the embodiment of FIG. 9 without carbon foam or fiber materials 62*a* or 56*a*. The measurements of FIG. 13 are taken from the inside center of vessel 59 closest to the valve 57, and the measurements of FIG. 14 are taken from the outside of the vessel. FIG. 14 illustrates the gentle curve representing the spike after the heat has been adsorbed by the water and vessel walls of vessel 52. In this embodiment, the temperature can still be measured as a slower change. Ice sublimation forms within vessel 52 when valve 57 is opened.

As the ice goes down in temperature to 22.4° F., ice is expanding against the vessel walls. Hoop stress resistance of vessel 52 walls is high enough to resist the expansion of ice. This ice compression against the walls of vessel 52 heats the ice phasing it back into a liquid chilling temperature of approximately 34° F. This increased temperature moves the process into a chiller full of water rather than processing against high surface area sublimating ice. In accordance with the present invention, fragmentation of the ice processing into fractions of the ice, by forcing the ice sublimation to take place in a porous metal foams, carbon foam, carbon fiber, copper foam, aluminum foam, plastic foam, screens, porous cintered metals, metal shavings, metal wools, glass fibers or flakes, ceramic porous materials, bonded porous materials, plastic porous materials, and micro spheres. Magnetoadsorbents are the preferred choice.

Figure 15:
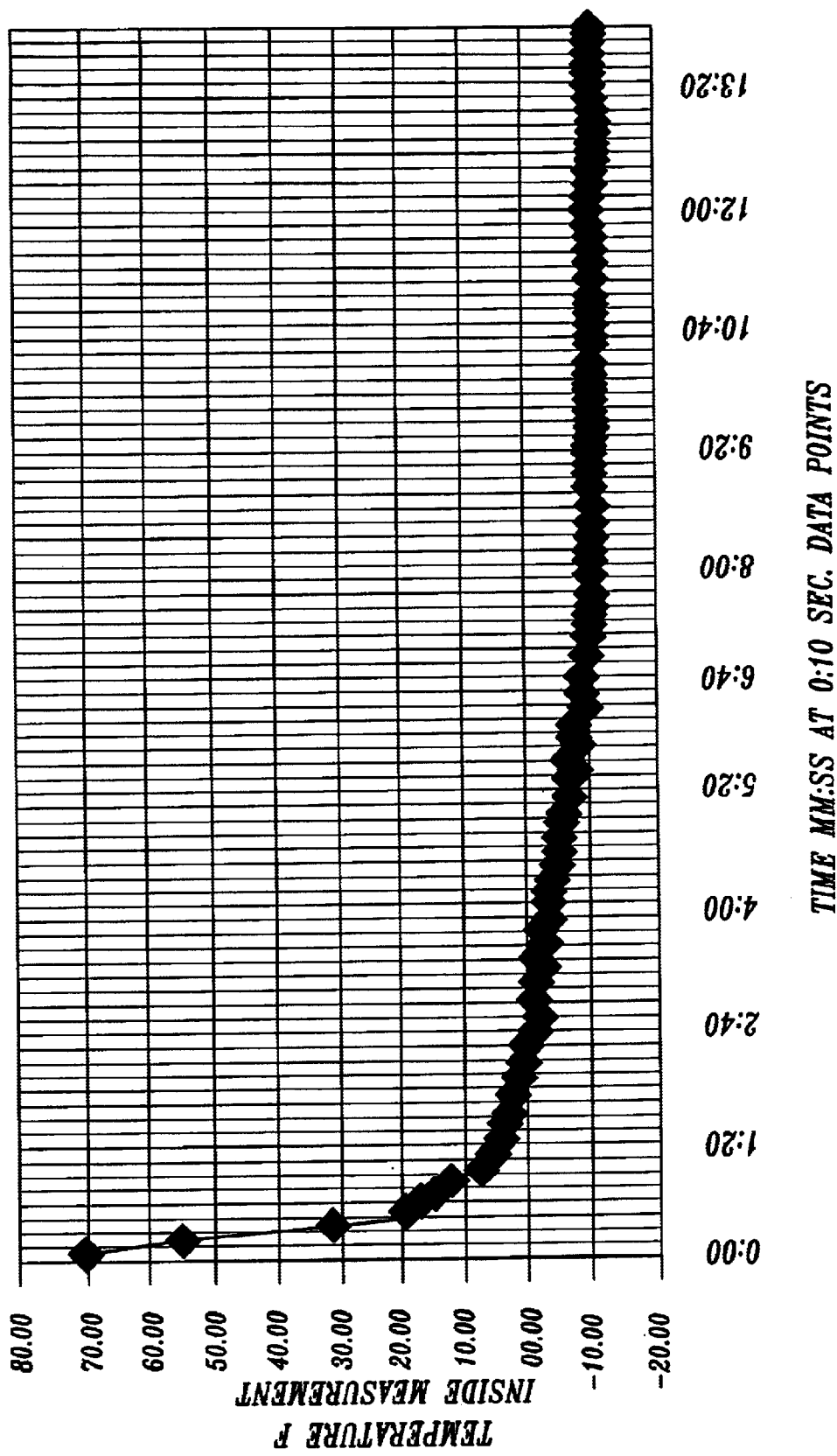
FIG. 15 illustrates a chart of ice sublimation curves without a heat spike measuring carbon foam performance as water is metered through the carbon foam.

Referring now to FIG. 15, these measurements chart a curve representing the metering of ice in the embodiment of FIG. 9, through carbon foam 56*a* by opening and closing valve 57 closing and opening conduit 56, which exposes the zeolite or adsorbent to adsorbate in vessel 52. Ice forms in carbon foam 56*a*. Thus, FIG. 15 charts an ice sublimation curve without a heat spike measuring carbon foam performance as water is metered through the carbon foam.

Referring again to FIG. 9, a further embodiment of this invention teaches a holding vessel 301 connected to vessel 51 through conduit 305 and conduit 304. Valves 303 and 306 provide water 302 isolation from vessel 51 and 52. Desiccant 61 is desorbed into vessel 301 through conduit 305 and valve 306 filling the vessel 301 with water or working fluid 302, when valve 57 closes conduit 56. Valve 304 is closed until vessel 301 is full and then valve 306 is closed preventing the water from adsorbing through conduit 305. To achieve the deep freezing curve shown in FIG. 15, valve 57 is now opened and water is metered 1 gram at a time through conduit 304 by opening valve 303 in short time intervals.

Carbon foam 62a and 56a break up the water into the isolated open pores of the conductive foam 62 and 56a and the water freezes in the foam preventing the ice from compressing against the vessel wall or against itself. Ice forms from micro droplets of water vapor isolated by conductive foam. FIG. 15 illustrates the increase in heat adsorption by the ice sublimation process by keeping the ice in the ice sublimation mode. Ice sublimation will phase out into heated chilling water vaporization pools if ice is allowed to compress against itself or vessel walls. In accordance with the present invention, higher cycle efficiencies are achieved by processing ice in isolated micro droplets of water or by ultrasonically vibrating the vessel during the ice formation and sublimation. Referring again to FIG. 9, the cycle is repeated by opening and closing valves 306, 303, and valve 57 while timing the heating cycle for desorption with valve 306 open and valve 57 closed. Valves 303 and 306 can remain closed and the system will still function, because of the pores in 62a and 56a.

Figure 16:
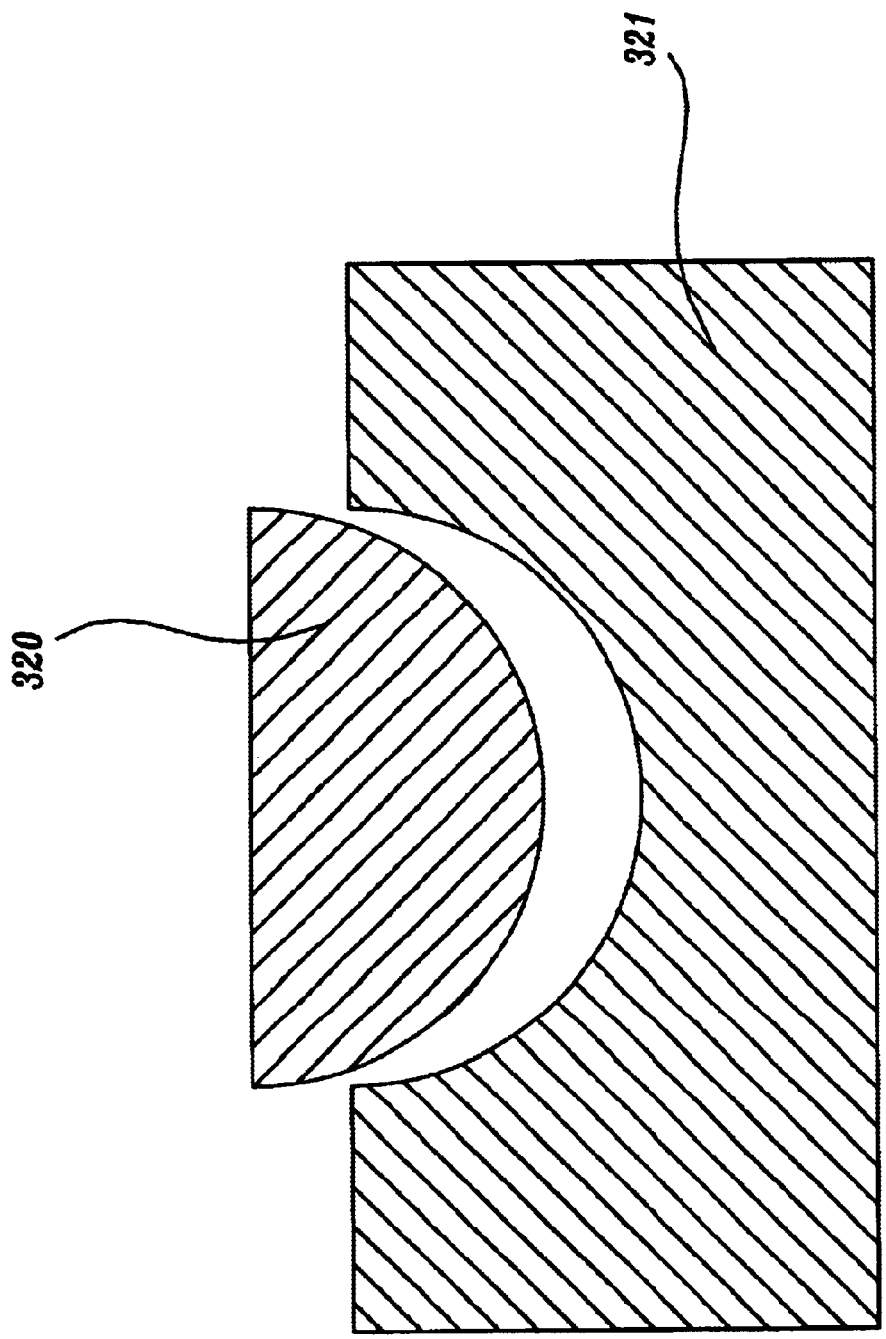
FIG. 16 illustrates a carbon foam mold for casting aluminum foam net shapes.

Referring now to FIG. 16, a carbon foam or solid carbon mold 320 is shaped from pitch based carbon foam (referenced above). Aluminum is a preferred mold for making carbon foam, because it does not need a mold release chemical. Carbon foam or solid releases from aluminum without additional chemicals as release agents. In accordance with the present invention, carbon foam is applied as the mold for casting aluminum to form aluminum into the shape of the carbon mold. Aluminum foam exhibits a combination of qualities not found in other low-density materials including sufficient strength to serve as structural members, good thermal qualities for insulation, resistance to fire and immunity to electromagnetic fields. Aluminum foam is strong enough to build panels without sheathing bonded to each side of the panel. Only aluminum foam is needed. Sheathing panels are bonded into a sandwich arrangement if extra strength is desired in application where thickness and strength need to be at the highest density.

In accordance with the present invention, aluminum foam is molded into final or near net shapes by molding the shape onto pitch based carbon. Prior to this invention, aluminum foam has only been produced that is very porous on the outer skin closed cells, which will crack open during the aluminum cooling stage. Pitch carbon based molds are heated and provide the molded shape without mold release agent all at the same time. By heating the carbon foam up to the cast temperature of the aluminum foam (700–800° C.) the aluminum is slowly cooled preventing surface cell loss. Conveyers, flat surface, vessels multi-part molds, can all be made from pitch based carbon. Any tool shape can be derived from this method providing a final or near net shape of aluminum based products.

In a further embodiment, the ice sublimation process can be provided throughout the process by ultrasonically vibrating the water or ice during the cycle by providing ultrasonic wafer 300 as discussed above in reference to FIG. 9. Wafer 300 vibrates vessel 52 substantially preventing hoop stresses that generated heat in the ice by breaking up the ice during its formation. This process is preferred when a conductive carbon copper, aluminum, plastic, ceramic, glass or fiber material 62a is in vessel 52. Preferably, that material 62a completely fills the vessel 52 integrating all the water into the pores of the material. This wafer can be inside in contact with the water or attached to the outside of the vessel, without departing from the scope of the present invention.

Referring again to FIG. 16, a carbon foam mold is shown for casting aluminum foam net shapes. The carbon foam is porous and in some embodiments is used to blow air into aluminum foam to manufacture closed cell aluminum foam. If open cell aluminum foam is desired, the carbon foam can be above the silica carbonate molten aluminum, and a vacuum can be pulled foaming the aluminum in an open celled structure. Currently spinning air is used to foam, and cannot manufacture open celled foam. This method of blowing into the aluminum through a nonstick carbon foam and pulling a vacuum to obtain an open celled foam is performed in accordance with the present invention. The pore size of the carbon foam is very small and will provide a uniform aluminum foam, where the aluminum foam is produced from spinning air but is not uniform like blowing or pulling air through a carbon foam structure. The carbon foam is also non-attrition and non-stick.

Figure 17:
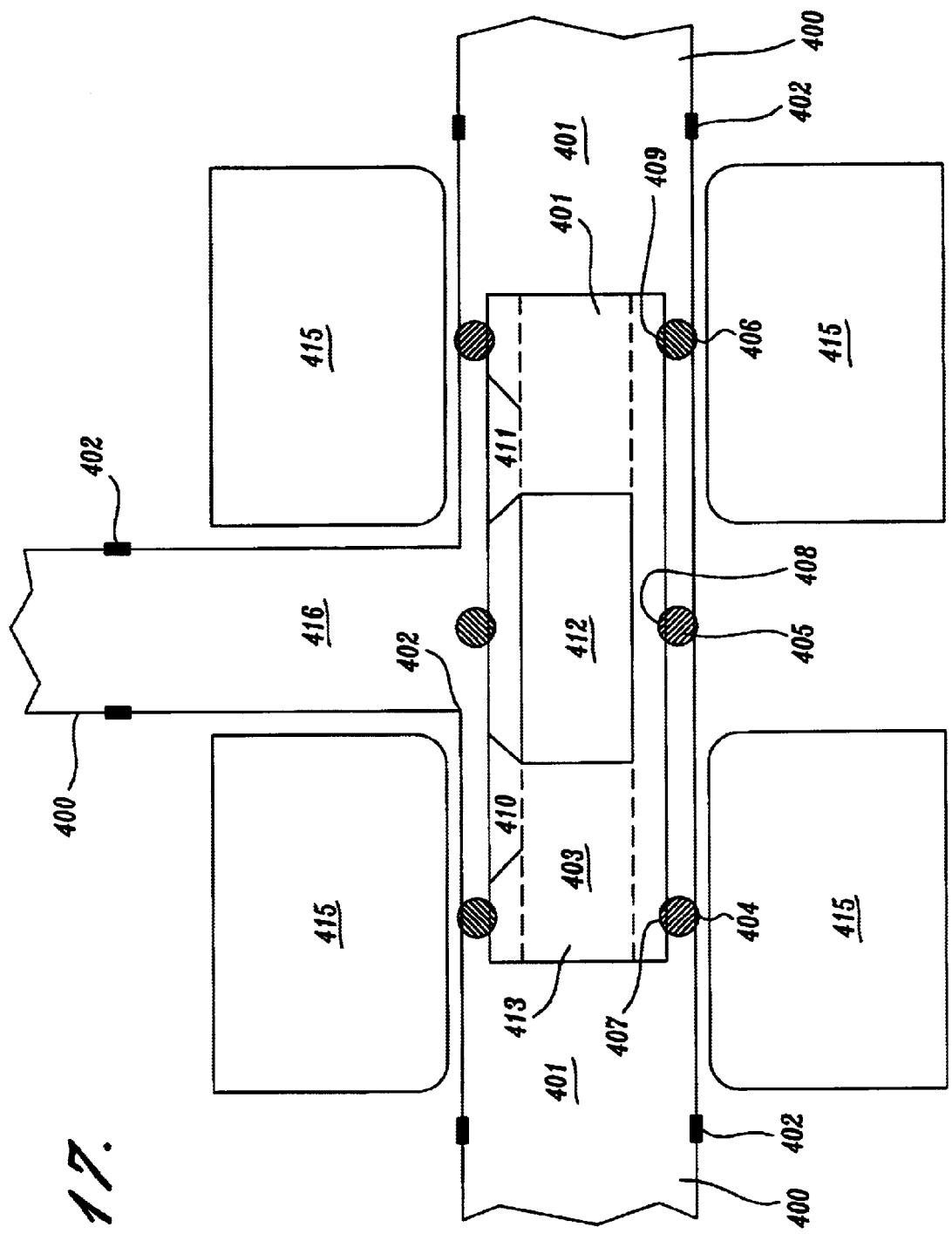
FIG. 17 illustrates a seal less magnetically actuated valve.

Referring now to FIG. 17, a magnetically actuated sealless valve for valve area 57 is provided. Conduit 400 is sealed to vessel 401 by heat sweat solder, dielectric adhesives, adhesives, glass, or ultrasonic welding at seal 402. These connections throughout the invention are spun components not requiring a seal. Conduit 400 and vessel 401 are the same diameter tubing made of copper, aluminum, and other non-ferrite materials like glass or plastic. Copper is the preferred material, because it has an eddy current effect when a magnetic field is moved across it. Vessel 400 is a housing for an internal magnetically actuated valve.

In one preferred embodiment, the internal surface of vessel 400 is coated with a solid film lubricant of Ford 25D coating, (manufactured by Sandstrom or a magnetoadsorbent 4 referenced in FIG. 2). This dry lubricant bearing surface is important because it is hydrophilic and adsorbs lubricant when applied retaining a bearing surface. A valve poppet 403 made of ferritic alloy or magnetic material is inserted into vessel 400. Stem seal 404, 405, and 406 are mounted on stem recess 407, 408, 409 respectfully. Valve poppet 403 is a tube with passage 410 and 411. Center plug 412 provides the division of fluid flow in the valve through the two openings passages 413 and 414. External magnet source 415 attracts or repels the valve poppet 403 moving its location registering either valve passage 413 or 414 with conduit 416.

This valve assembly is applied to a closed system like the refrigeration system in the present invention where a sealless vessel and conduit system are required for a high vacuum. No leaks are possible when the valves are moved by electromagnetic excitement or permanent magnet attraction or repelling. In some embodiments this valve is cut in half, providing a passage through a single conduit. The valve seal can be at the end of valve poppet 403 or on the stem as provided. Plug type rotary valves, a plate, and ball valves can also be externally excited within vessel 401 by providing a magnetic polarity on the replacement of valve poppet 403, without departing from the scope of the present invention. (For example, a ball valve would have a north and south face.) Alternatively, eddy currents are applied to copper replacing the need for magnetic alloys in valve poppet 403. The internal copper poppet 403 move, because there is an air gap provided by the valve stem seals 404, 405, and 406. In a preferred embodiment, a montmorillonite paste is applied between the poppet 403 and the wall around the poppet to hold the location of the poppet after magnetic excitation. The poppet 403 outside surface is provided with a rough surface that will adhere to montmorillonite and the tube the poppet travels in will be similar in friction. When the poppet is moved by magnetic excitation, the poppet overcomes the shear strength of the montmorillonite and the montmorillonite instantaneously becomes a lubricated seal allowing the poppet to move. When the magnetic excitement is removed from the poppet the montmorillonite reforms a bond where sheared. There is no attrition on this shear surface and no changed in the seal leak rate. The poppet can be a magnet.

A one step water cleanup system (developed by Wyoming-Gem) applied modified montmorillonites to adsorb metals or other waste products like latex paint, inks, heavy metals, or other suspended waste. A powder of this unique material is dumped into the contaminated water and then stirred for approximately thirty second. The montmorillonite (BENTINITE) jells together and settle to the bottom of the tank of water. In a preferred embodiment of the present invention, the magnetoadsorbent is mixed into this batch process providing a less aggressive adsorbent, but one that sticks within the montmorillonite. This provides a magnetic potential jell that is manipulated and removed without removing the purified water. In some embodiments, ultrasonic wafers are used inside the fluid to mix and enhance the uniform bonding of the montmorillonite to the waste. These ultrasonic wafers can be arranged to drive out the water from the jell and when wafers are stacked they could squeeze the moisture out of the jell. This is important to remove and manipulate the moisture out of the montmorillonite jell so it can be sent to land fill for disposal. The moisture content in this jell is the measure of whether it is qualified to be land fill dumped or not. The specific modified montmorillonites isolate and adsorb targeted materials dissolved or suspended in the water.

The ultrasonic wafers prepare the water prior to adding the montmorillonite by ultrasonically vibrating the water separating the water from suspensions by ultrasonic water/particle separation. A conduit next to the ultrasonic wafer will be exposed to a near pure pool of water that forms from the vibration of the wafer in the water. The purity of the water pool within water is formed from the sonic energy field of the wafer. This water purification system has great application to prepare water to be frozzed or manipulated by magnetoadsorbents. The poppet can be a magnet.

The present invention has been described in relation to a preferred embodiment and several alternate preferred embodiments. One of ordinary skill, after reading the foregoing specification, may be able to affect various other changes, alterations, and substitutions or equivalents thereof without departing from the concepts disclosed. It is therefore intended that the scope of the Letters Patent granted hereon be limited only by the definitions contained in the appended claims and equivalents thereof.

The embodiments of the invention in which an exclusive property or privilege is claimed are defined as follows:

1. A molecular separator apparatus, which uses an electric swing carbon fiber to control desorption of an adsorbate from a composition of matter in the apparatus, the apparatus comprising:

a first vessel within a second vessel, each vessel bonded electrically to the electric swing carbon fiber;

a concentric, non-electrically conductive seal connectably associated with each of the vessels; and an electric power supply connected to each vessel.

2. The apparatus of claim 1, wherein the adsorbate is an oderant and the vessels are exposed to air.

3. The apparatus of claim 1, further comprising a carbon fiber monolith injected with oderants that are electrically desorbable to selectively reproduce smells.

4. The apparatus of claim 1, wherein the adsorbate is an oderant, and said oderants are electrically desorbable to selectively reproduce smells via a computer network.

5. The apparatus of claim 1, wherein the adsorbate is an oderant, and said oderants are electrically desorbable to selectively reproduce smells via television signals.

6. The apparatus of claim 1, wherein the composition of matter includes a high kinetic adsorbent bonded to the electric swing carbon fiber.

7. The apparatus of claim 1, wherein the electric swing carbon fiber is in thermally conductive contact with a refrigeration cold element to collect moisture from air and desorb said moisture electrically around a due point of a given environment.

8. The apparatus of claim 1, wherein the composition of matter includes carbon foam.

* * * * *